United States Patent
Ogikubo et al.

(10) Patent No.: US 8,924,397 B2
(45) Date of Patent: Dec. 30, 2014

(54) DEVICE AND METHOD FOR PROCESSING INFORMATION

(75) Inventors: Junichi Ogikubo, Kanagawa (JP); Yasuhiro Ichinaka, Kanagawa (JP); Shigeru Ohwada, Kanagawa (JP)

(73) Assignee: Sony Corporation, Tokyo (JP)

( * ) Notice: Subject to any disclaimer, the term of this patent is extended or adjusted under 35 U.S.C. 154(b) by 518 days.

(21) Appl. No.: 12/889,841

(22) Filed: Sep. 24, 2010

(65) Prior Publication Data

US 2011/0082869 A1  Apr. 7, 2011

(30) Foreign Application Priority Data

Oct. 2, 2009  (JP) ............................... P2009-230941

(51) Int. Cl.
 *G06F 7/00* (2006.01)
 *G06F 17/30* (2006.01)

(52) U.S. Cl.
 CPC ................................ *G06F 17/30781* (2013.01)
 USPC ........................................................ 707/752

(58) Field of Classification Search
 CPC ................................................. G06F 17/30849
 USPC ........................................................ 707/752
 See application file for complete search history.

(56) References Cited

U.S. PATENT DOCUMENTS

| 6,751,795 | B1 * | 6/2004 | Nakamura ..................... 717/174 |
| 7,020,196 | B2 | 3/2006 | Suzuki et al. |
| 7,738,550 | B2 | 6/2010 | Kuhn |
| 2004/0076232 | A1 * | 4/2004 | Akiyama et al. ......... 375/240.08 |
| 2005/0226530 | A1 * | 10/2005 | Murayama ..................... 382/276 |
| 2005/0257241 | A1 * | 11/2005 | Faulkner et al. ................ 725/92 |
| 2006/0123064 | A1 | 6/2006 | Kim et al. |
| 2008/0147864 | A1 | 6/2008 | Drogo De Iacovo et al. |
| 2009/0276471 | A1 * | 11/2009 | Baer et al. ..................... 707/203 |

FOREIGN PATENT DOCUMENTS

| JP | 11-250588 | 9/1999 |
| JP | 2001-203971 | 7/2001 |
| JP | 2002 44622 | 2/2002 |
| JP | 2002 77855 | 3/2002 |
| JP | 2003-256253 | 9/2003 |
| JP | 2003 527005 | 9/2003 |
| JP | 2005-20328 | 1/2005 |
| JP | 2005-122252 | 5/2005 |

OTHER PUBLICATIONS

"Profile XP User Guide Software version 5.2", [Online] No. 071-8246-00, Jul. 31, 2003, pp. 1-84, XP002615722, USA Retrieved from the Internet: URL:http://www.grassvalley.com/docs/Manuals/servers/pvs1000/071-8246-00.pdf> [retrieved on Jan. 3, 2011].

* cited by examiner

*Primary Examiner* — Fred I Ehichioya
*Assistant Examiner* — Kris Mackes
(74) *Attorney, Agent, or Firm* — Frommer Lawrence & Haug LLP

(57) ABSTRACT

An information processing device includes a file-information acquirer and a conversion-management information generator. The file-information acquirer is configured to acquire file information that is information regarding a file to be subjected to conversion processing for converting a clip format. The conversion-management-information generator generates conversion management information that manages an identity of a clip created by the conversion processing performed on a clip to which the file corresponding to the file information belongs, by using the file information acquired by the file-information acquirer.

19 Claims, 34 Drawing Sheets

FIG. 8

CLIP METADATA:

CLIP NAME

OWNER

TIME STAMP

VIDEO SIZE

FRAME RATE

ENCODING PARAMETER

CODEC

BITRATE

SOURCE (PARENT) FILE PATH

RELATED METADATA FILE PATH

CLIP ID

FAMILY-TREE ID

TRANSCODING PARAMETER

MEDIA [VIDEO] FILE PATH

MEDIA [PROXY] FILE PATH

THUMBNAIL FILE PATH

MEDIA [AUDIO] FILE PATH

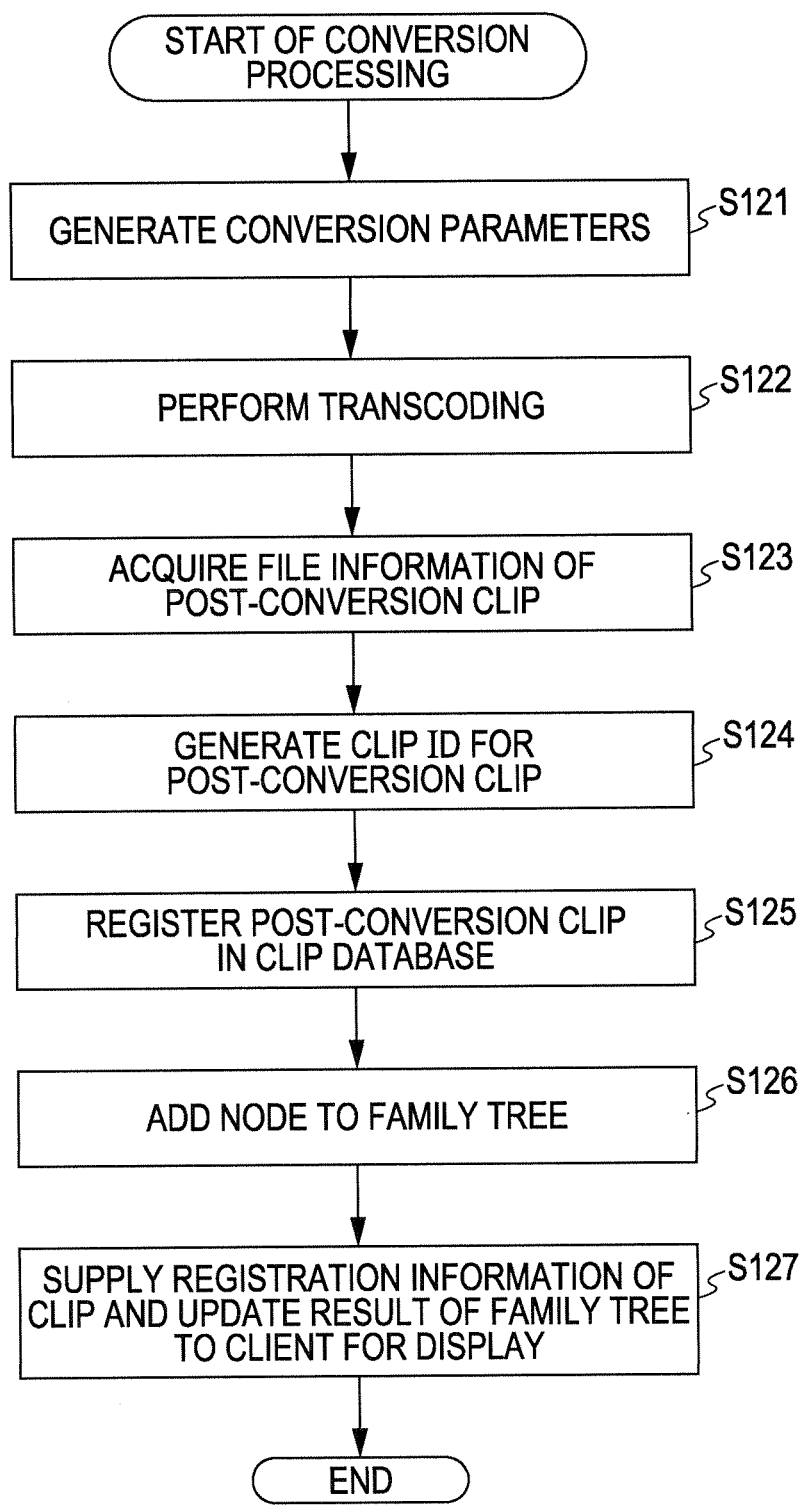

DEVICE AND METHOD FOR PROCESSING INFORMATION

BACKGROUND OF THE INVENTION

1. Field of the Invention

The present invention relates to information processing devices and information processing methods. In particular, the present invention relates to an information processing device and an information processing method that are capable of easily checking and using history of format conversion.

2. Description of the Related Art

In recent years, methods for supplying and distributing content including video and audio are increasingly becoming diverse, and correspondingly, standards for content are also becoming diversified.

For example, formats of content have been standardized depending on various applications. Examples of the applications include distribution of content recorded on storage media, such as DVDs (digital versatile discs) and CDs (compact discs), distribution of content over networks, such as the Internet, transfer of content to mobile electronic devices, terrestrial digital broadcasting, satellite broadcasting, and content shown at cinemas.

In conjunction with such diversification of content applications, content creation involves transcoding (converting) content into various formats, and systems for converting the formats of multimedia content have been developed (e.g., refer to Japanese Unexamined Patent Application Publication (Translation of PCT Application) No. 2003-527005 and Japanese Unexamined Patent Application Publication Nos. 2002-44622 and 2002-77855).

SUMMARY OF THE INVENTION

In the systems of the related art, however, history indicating which file was converted and which file was created is not managed. Thus, for retrieval of a conversion-source parent file, the user has to manually check an image and/or a format of each file, which involves cumbersome task.

In recent years, for such content creation, demands for transcoding (converting) the formats of multimedia content are increasing day by day, and transcoding (converting) the formats into more various formats is performed more often.

Consequently, the hierarchies in the format conversion have become more complicated, thus making it more difficult to perform conversion-source parent-file retrieval as described above. Correspondingly, for example, occasions of work for redoing conversion processing (re-transcoding) increase, and occasions of retrieval of conversion-source parent-file retrieval as described above and also retrieval of a more original file (i.e., an earlier ancestor file) are also increasing.

In addition, there is also a possibility that, during retrieval of a conversion-source file, an erroneous file that is different from the correct source file is retrieved. In such a case, it is difficult to correctly recover an intended file through re-transcoding.

In view of such a situation, it is desirable to make it possible to easily check and use history of format conversion.

According to one embodiment of the present invention, there is provided an information processing device. The information processing device includes: file-information acquiring means for acquiring file information that is information regarding a file to be subjected to conversion processing for converting a clip format; and conversion-management-information generating means for generating conversion management information that manages an identity of a clip created by the conversion processing performed on a clip to which the file corresponding to the file information belongs, by using the file information acquired by the file-information acquiring means.

The conversion management information may further include: clip information that is information regarding the clip created by the conversion processing; and family-tree information that indicates a hierarchy of the conversion processing. In the family-tree information, the clip to which the file corresponding to the file information acquired by the file-information acquiring means belongs is an earliest ancestor.

The clip information may include file information of the file belonging to the clip, conversion parameters that are parameters of the conversion processing by which the clip is created, clip identification information that identifies the clip, and family-tree identification information that identifies the family-tree information.

The conversion-management-information generating means may include: clip-identification-information generating means for generating the clip identification information; family-tree-identification-information generating means for generating the family-tree identification information; clip-information generating means for generating the clip information by using the file information acquired by the file-information acquiring means, the clip identification information generated by the clip-identification-information generating means, and the family-tree identification information generated by the family-tree-identification-information generating means; and family-tree-information generating means for generating the family-tree information by using the clip identification information generated by the clip-identification-information generating means and the family-tree identification information generated by the family-tree-identification-information generating means.

The information processing device may further include: file acquiring means for acquiring the file to be subjected to the conversion processing. When the file acquiring means acquires the file from a storage medium other than the information processing device, the clip-identification-information generating means may generate identification information of the storage medium and the family-tree-information generating means may generate family-tree information in which the storage medium is an earliest ancestor.

The information processing device may further include display controlling means for causing display of the clip information generated by the clip-information generating means and the family-tree information generated by the family-tree-information generating means.

The information processing device may further include: clip-information storing means for storing the clip information generated by the clip-information generating means; and family-tree-information storing means for storing the family-tree information generated by the family-tree-information generating means.

The information processing device may further include clip retrieving means for retrieving the clip that is the earliest ancestor in the family-tree information.

The information processing device may further include: conversion processing means for performing the conversion processing; and conversion-management-information updating means for updating the conversion management information so as to reflect a result of the conversion processing performed by the conversion processing means.

According to one embodiment of the present invention, there is provided an information processing method. The information processing method includes the steps of: acquiring file information that is information regarding a file to be subjected to conversion processing for converting a clip format; and generating conversion management information that manages an identity of a clip created by the conversion processing performed on a clip to which the file corresponding to the file information belongs, by using the acquired file information.

According to another embodiment of the present invention, there is provided an information processing device. The information processing device includes: clip-identification-information acquiring means for acquiring, on the basis of conversion management information that manages a clip identity and that indicates conversion processing for converting a clip format, clip identification information with respect to an ancestor clip of an intended clip to be generated by performing the conversion processing on the ancestor clip; clip-information acquiring means for acquiring clip information of the ancestor clip from the conversion management information by using the clip identification information acquired by the clip-identification-information acquiring means; conversion-parameter acquiring means for acquiring, from the conversion management information, conversion parameters that are parameters of the conversion processing; and conversion processing means for performing the conversion processing on the ancestor clip by using the clip information acquired by the clip-information acquiring means and the conversion parameters acquired by the conversion-parameter acquiring means, to recover a file of the intended clip.

The conversion management information may include the clip information and family-tree information indicating a hierarchy of the conversion processing; and the clip-identification-information acquiring means may identify the ancestor clip on the basis of the family-tree information to acquire the clip identification information of the ancestor clip.

The clip information may include file information of a file belonging to the clip, the conversion parameters, the clip identification information, and family-tree identification information that identifies the family-tree information.

The information processing device may further include conversion-management-information updating means for updating the conversion management information so as to reflect a result of the conversion processing performed by the conversion processing means.

The conversion processing means may perform all conversion processing to be used to recover the file of the intended clip from the ancestor clip.

The information processing device may further include omission-parameter generating means for generating, by using the conversion parameters that are obtained by the conversion-parameter acquiring means and that indicate all conversion processing to be used to recover the file of the intended clip from the ancestor clip, omission parameters that are conversion parameters with which the file of the intended clip is recovered from the ancestor clip by performing conversion processing once. The conversion processing means may recover the file of the intended clip from the ancestor clip by performing the conversion processing once, through use of the omission parameters generated by the omission-parameter generating means.

The information processing device may further include mode selecting means for selecting one of a reproduction mode and an omission mode as a processing mode in which the conversion processing means recovers the file of the intended clip. In the reproduction mode, all conversion processing to be used to recover the file of the intended clip from the ancestor clip is performed, and in the omission mode, the file of the intended clip is recovered from the ancestor clip by performing conversion processing once using omission parameters that are conversion parameters generated using the conversion parameters of all conversion processing to be used to recover the file of the intended clip from the ancestor clip. The conversion processing means may perform the conversion processing in the processing mode selected by the mode selecting means to recover the file of the intended clip.

According to another embodiment of the present invention, there is provided an information processing method. The information processing method includes the steps of: acquiring, on the basis of conversion management information that manages a clip identity and that indicates conversion processing for converting a clip format, clip identification information with respect to an ancestor clip of an intended clip to be generated by performing the conversion processing on the ancestor clip; acquiring clip information of the ancestor clip from the conversion management information by using the acquired clip identification information; acquiring, from the conversion management information, conversion parameters that are parameters of the conversion processing; and performing the conversion processing on the ancestor clip by using the acquired clip information and the acquired conversion parameters, to recover a file of the intended clip.

According to one embodiment of the present invention, file information that is information regarding a file to be subjected to conversion processing for converting a clip format is acquired and, through use of the acquired file information, conversion management information that manages an identity of a clip created by the conversion processing performed on a clip to which the file corresponding to the file information belongs is generated.

According to another embodiment of the present invention, on the basis of conversion management information that manages a clip identity and that indicates conversion processing for converting a clip format, clip identification information is acquired with respect to an ancestor clip of an intended clip to be generated by performing the conversion processing on the ancestor clip; clip information of the ancestor clip is acquired from the conversion management information by using the acquired clip identification information; conversion parameters that are parameters of the conversion processing is acquired from the conversion management information; and the conversion processing is performed on the ancestor clip by using the acquired clip information and the acquired conversion parameters, to recover a file of the intended clip.

According to the present invention, it is possible to convert the format of content. In particular, the present invention makes it possible to easily check and use history of the format conversion.

BRIEF DESCRIPTION OF THE DRAWINGS

FIG. 8 illustrates an example of information registered in a clip database;

FIG. 13 is a flowchart illustrating an example of a flow of conversion processing;

DESCRIPTION OF THE PREFERRED EMBODIMENTS

Modes (hereinafter referred to as "embodiments") for carrying out the present invention will be described below.
[Configuration of Converter System]

Figure 1:
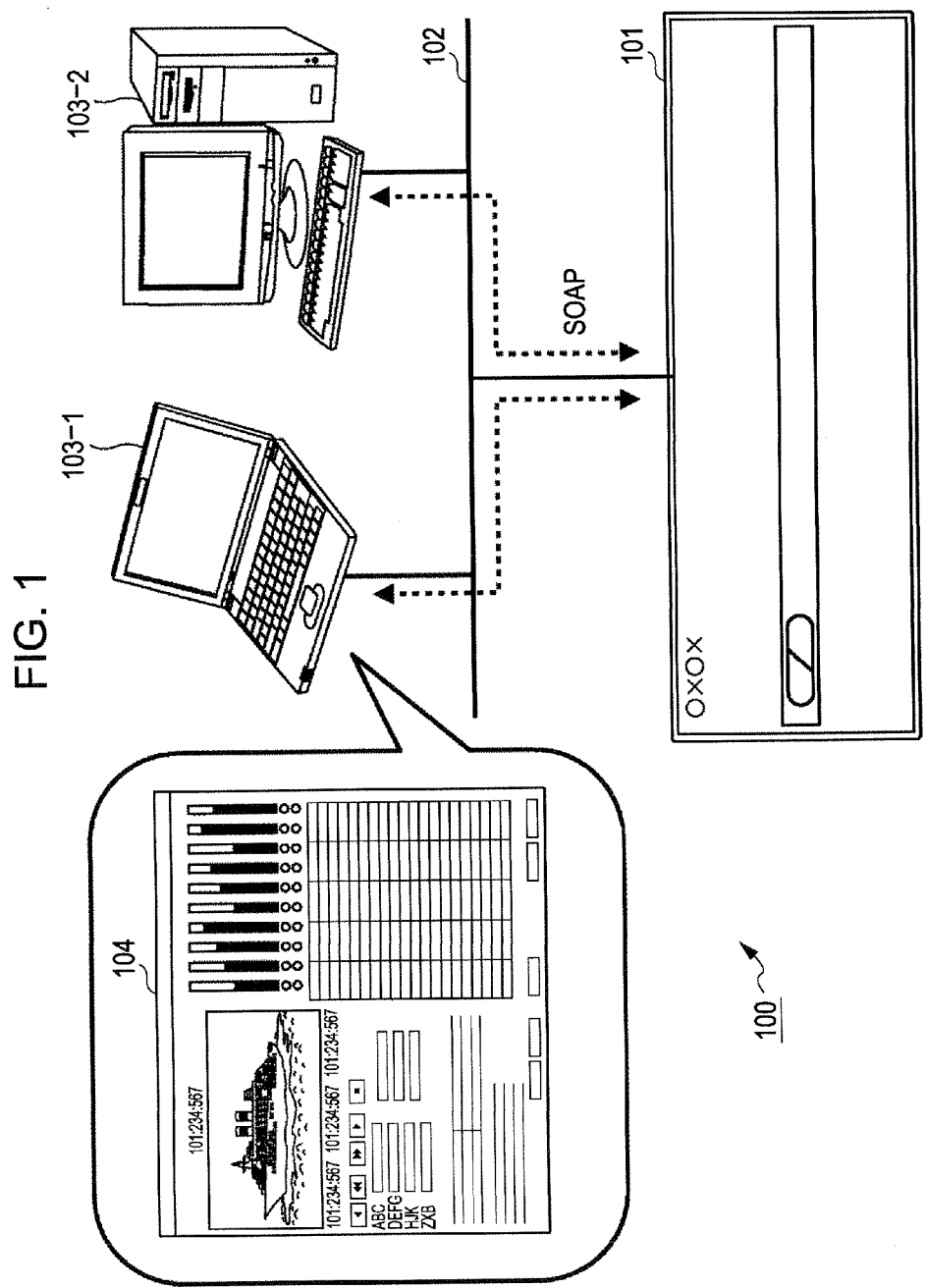
FIG. 1 is a block diagram showing a major configuration example of a converter system according to an embodiment of the present invention.

FIG. 1 illustrates the configuration of a converter system according to one embodiment of the present invention.

In FIG. 1, a converter system 100 serves as an information processing system for transcoding (converting) a format of multimedia content including video and/or audio.

As shown in FIG. 1, the converter system 100 includes a multi-format transcoder 101 and remote clients 103-1 and 103-2, which are connected through a network 102.

The multi-format transcoder 101 serves as a processing device for transcoding (converting) a format of content. The multi-format transcoder 101 can process multimedia content including video and/or audio.

The content may include, for example, pieces of material data of video, audio, and/or the like. Even when the pieces of material data are converted into respective files, the multi-format transcoder 101 manages and processes the files as a single material. A collection of material data, metadata, and so on which are regarded by the multi-format transcoder 101 as a single material, in a manner as described above, is referred to as a "clip" hereinafter.

The clip may contain arbitrary data. For convenience of description, it is assumed hereinbelow that the clip contains video data, audio data, proxy data (low-resolution data) obtained by reducing the resolutions of video of video data, and metadata regarding data of the content. Needless to say, the clip does not necessarily have to include all of those pieces of data, and may contain other data.

The metadata contains content and information regarding various data. For example, the metadata contains the name of content, the number of a scene or a take, time code of an in point and an out point, duration, date and time of creation, date and time of update, a supplementary memo during photography, a comment, and so on. Examples of the supplementary memo include a location and weather. Needless to say, the metadata may contain any other information or does not necessarily have to contain those pieces of information.

Clips are standardized in various manners, depending on their applications and so on, and various formats are available. Depending on the format, the format of each piece of data (each file) included in the clip may vary or information contained in each piece of data may vary. The multi-format transcoder 101 performs processing (transcoding) for converting the format of such a clip into another format.

The multi-format transcoder 101 is controlled by the remote client 103-1 or 103-2 through the network 102, which is typified by the Internet, a LAN (local area network), or the like.

Using a SOAP (simple object access protocol), the remote clients 103-1 and 103-2 communicate with the multi-format transcoder 101 to control the operation thereof. Needless to say, the remote clients 103-1 and 103-2 may use a protocol other the SOAP to control the multi-format transcoder 101.

The remote client 103-1 and the remote client 103-2 will simply be referred as "remote clients 103", unless they should be distinguished from each other in the description. The number of remote clients 103 in the converter system 100 is arbitrary. Each remote client 103 may be any electronic equipment that can communicate with the multi-format transcoder 101 through the network 102 and that can control the multi-format transcoder 101. The remote client 103 may be, for example, the so-called "mobile device", such as a notebook personal computer or a mobile phone, or a stationary electronic device, such as a desktop personal computer or a hard disk recorder.

The remote client 103 has a monitor, which displays a GUI (graphical user interface) 104 for receiving an operation for controlling the multi-format transcoder 101. A user performs an operation on the GUI 104 to input a user instruction to the remote client 103. The remote client 103 supplies the input user instruction to the multi-format transcoder 101 through the network 102 to control the operation of the multi-format transcoder 101.

The network 102 may have any configuration that can serve as a communication medium between the multi-format transcoder 101 and the remote clients 103. For example, the network 102 may be a wired communication network, a wireless communication network, or a combination thereof. The network 102 may also be constituted by multiple networks.

The converter system 100 may include multiple multi-format transcoders 101.

[Overview of Transcoding]

Figure 2:
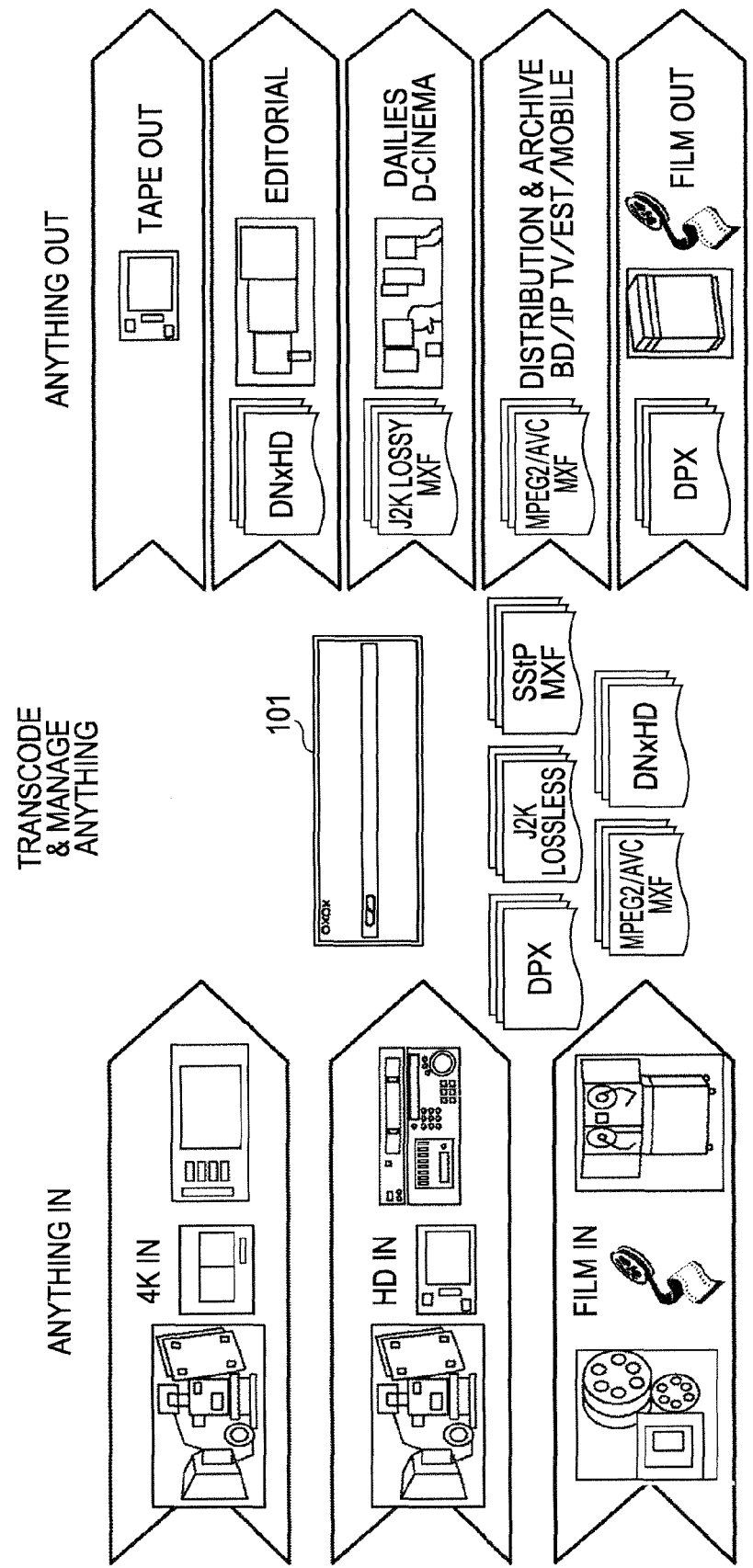
FIG. 2 illustrates types of multi-format transcoding.

An overview of transcoding performed by the multi-format transcoder 101 will be described next. FIG. 2 is a diagram illustrating types of multi-format transcoding.

The multi-format transcoder 101 may have an encoder and a decoder based on an arbitrary standard and can perform transcoding (conversion processing) between arbitrary formats.

For example, as shown in FIG. 2, the multi-format transcoder 101 can perform conversion processing on formats, such as DPX (Digital Picture Exchange), lossless JPEG (Joint Photographic Experts Group) 2000, MXF (Material exchange Format) which is a business-oriented video file format using MPEG (Moving Picture Experts Group) 2, AVC (Advanced Video Coding), and so on, and DNxHD (Digital Nonlinear Extensible High Definition).

The multi-format transcoder 101 transcodes (converts) the format of a clip. The transcoding involves all types of conversion processing related to format conversion. Examples of the conversion processing include changing a video size, aspect ratio, frame rate, and so on and re-encoding of material data of video, audio, and so on (e.g., burn-in of time code, title, and so on), as well as update of the contents of metadata.

The multi-format transcoder 101 registers and manages, as a clip, a group of files (digital data) included in content and performs transcoding on the registered clip. In other words, the multi-format transcoder 101 performs transcoding on files (digital data) registered as a clip.

The multi-format transcoder 101 has an ingest function, i.e., a function for converting content having an arbitrary format into digital data and registering the digital data as a clip. Thus, the type of input content is arbitrary (i.e., Anything In).

As shown in FIG. 2, the input content may be multimedia content including the so-called "4K video" with 4096×2160 dots which is used at digital cinemas and so on or may be multimedia content including HD (high-definition) video with 1920×1080 dots. The data of the content may be transmitted to the multi-format transcoder 101 through the network 102 or the data recorded on a storage medium, such as an optical disk or a flash memory, may be supplied to the multi-format transcoder 101. The data may also be non-digital data, such as film video.

Similarly, the multi-format transcoder 101 has a function for converting digital data into content having an arbitrary format. Thus, the type of content to be output is arbitrary (i.e., Anything Out).

For example, the multi-format transcoder 101 can output a converted clip through a VTR (Tape Out), can output a converted clip as data for edit, can output a converted clip as digital cinema content, can output a converted clip as content based on a standard for distribution and archive, and can output a converted clip as film video.

Not only does the multi-format transcoder 101 transcode one format into another format, as described above, but also the multi-format transcoder 101 manages information (conversion management information) regarding the transcoding (i.e., Transcode & Manage Anything).

The multi-format transcoder 101 compiles, for example, information regarding transcoding details (transcoding parameters) and information (metadata and so on) regarding pre- and post-conversion clips (or files) into a database as the conversion management information and manages the conversion management information therein. The multi-format transcoder 101 also compiles, as the conversion management information, a transcoding family tree (a pedigree chart) into a database for management. The family tree is information indicating a state (a hierarchy) of the transcoding, i.e., information indicating which clip (file) is created from a particular clip (file).

[Conversion Hierarchy]

Figure 3:
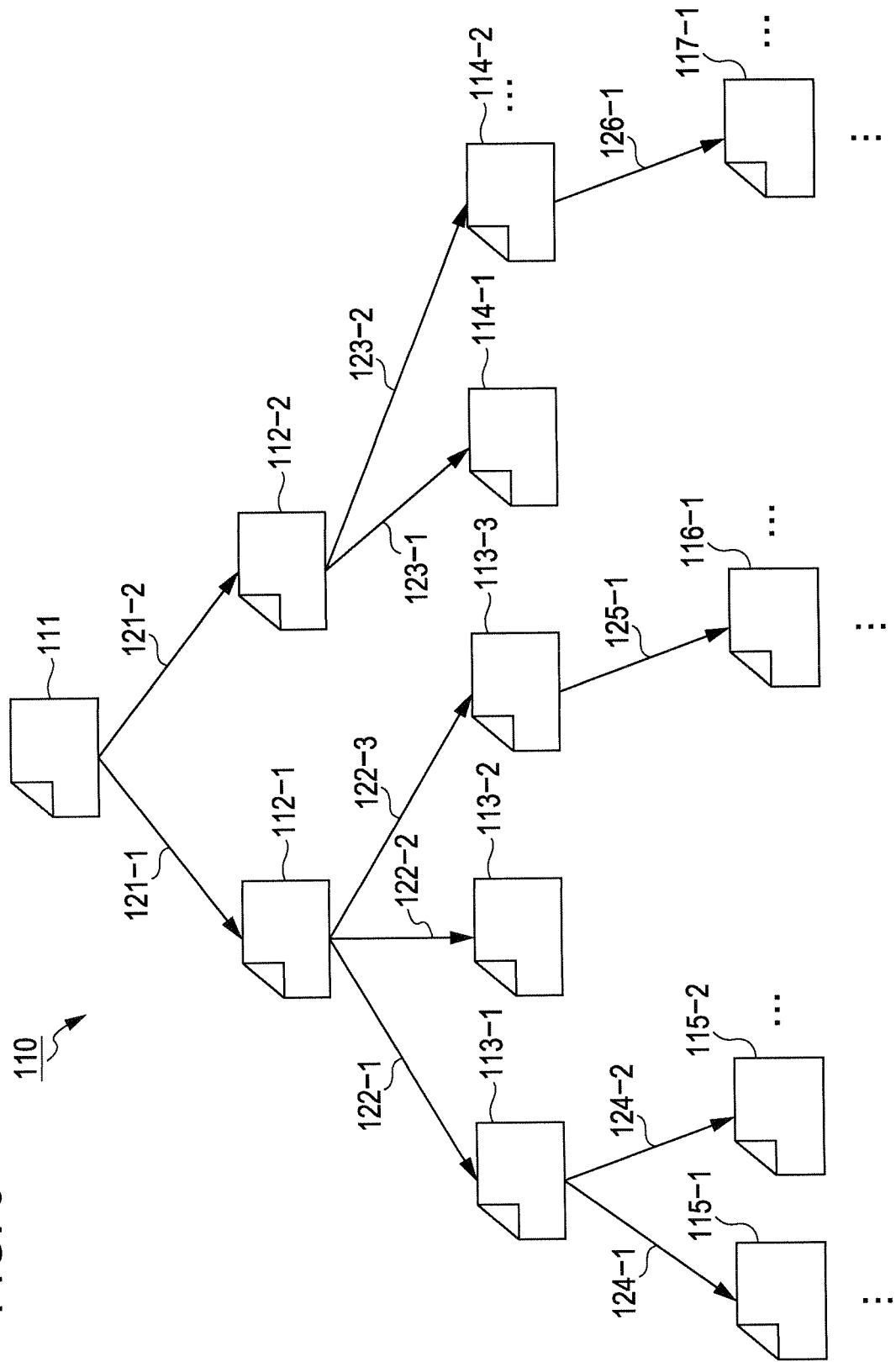
FIG. 3 illustrates an example of a hierarchy of format conversion.

The transcoding hierarchy will now be described in detail. FIG. 3 illustrates an example of a hierarchy in format conversion.

In FIG. 3, a conversion hierarchy 110 represents a transcoding conversion hierarchy in which a clip 111 is an original (an earliest ancestor). As shown in FIG. 3, in the conversion hierarchy 110, a clip 111 is transcoded as indicated by arrow 121-1, so that a clip 112-1 is created. Similarly, the clip 111 is transcoded as indicated by arrow 121-2, so that a clip 112-2 is created.

Similarly, the clip 112-1 is transcoded (as indicated by arrows 122-1 to 122-3), so that clips 113-1 to 113-3 are created; and the clip 112-2 is transcoded (as indicated by arrows 123-1 and 123-2), so that clips 114-1 and 114-2 are created.

Likewise, the clip 113-1 is transcoded (as indicated by arrows 124-1 and 124-2), so that clips 115-1 and 115-2 are created; the clip 113-3 is transcoded (as indicated by arrow 125-1), so that a clip 116-1 is created; and the clip 114-2 is transcoded (as indicated by arrow 126-1), so that a clip 117-1 is created.

In the manner described above, one clip can be transcoded into multiple formats. A clip resulting conversion can further be transcoded. As a result of such transcoding, one conversion hierarchy 110 in which one clip is the original (the earliest ancestor) is created as shown in FIG. 3.

In recent years, the formats of content have become more diverse. For example, one type of content may be shown at cinemas, may be sold in the form of DVDs (digital versatile discs) and BDs (Blu-ray Discs), may be distributed through the Internet, may be transferred to mobile devices, such as mobile phones and computerized-game consoles, and may be broadcast over television signals.

In content creation in recent years, it is typically necessary to make content to be created match various formats. Accordingly, format transcoding is performed more frequently. For content creation, it is, in many cases, necessary to further convert one format into another for use at sages (e.g., trial production and management) other than the final stage, and thus the occasions of transcoding are ever increasing. Hence, the conversion hierarchy 110 as shown in FIG. 3 is increasingly becoming more complex.

After transcoding is performed, the amount of information is basically reduced (the information is degraded), but new information may be added in some cases. Thus, when transcoding is performed to obtain an intended format, it is desired that an optimum node (clip) of nodes in the conversion hierarchy 110 be selected as a conversion-source clip so that desired information can be obtained without an unwanted increase in the amount of load of the processing.

However, when the conversion hierarchy 110 becomes complex, it becomes difficult for the user to manage (for example, store and manually record) all of the conversion hierarchy 110. When the conversion hierarchy 110 is not comprehensible, the user has to individually check the format of a file of each clip and so on to select an optimum one as a conversion-source clip, which involves cumbersome work.

Since the multi-format transcoder 101 manages the conversion hierarchy 110 as a family tree, the user can easily comprehend inter-clip relationships, the format of each clip, and so on, on the basis of the information of the family tree. Thus, it is possible to easily retrieve an optimum clip as a conversion source, as described above. In other words, the user can easily retrieve an arbitrary clip belonging to the conversion hierarchy to which a certain clip belongs (or can retrieve each file belong to an arbitrary clip).

A case in which a file (actual data) of each clip created by transcoding is deleted can happen. A user may wish to reuse (re-transcode) such a deleted file. In such a case, on the basis of the information regarding the transcoding, the information being managed by the multi-format transcoder 101, the user can easily and accurately locate a clip that serves as a conversion source of the deleted file and can easily understand details of the transcoding. That is, the multi-format transcoder 101 can easily recover a clip whose file is deleted.

When all files of all clips that can be used as conversion sources have been deleted, there are cases in which a clip (a file) is not recoverable. On the basis of the information regarding transcoding, the information being managed by the multi-format transcoder 101, the user can also easily recognize whether or not such a clip (file) can be recovered.

As described above, since the multi-format transcoder 101 manages the information regarding transcoding, it is possible to easily recover a clip whose file is deleted. Consequently, it is not necessary to save all of files created by transcoding. That is, the multi-format transcoder 101 can reduce the cost for file storage. Since the amounts of data of content are increasing steadily in recent years, the capability to delete unwanted files, for example, files that are used less frequently, is a great advantage.

[Configuration of Devices]

Figure 4:
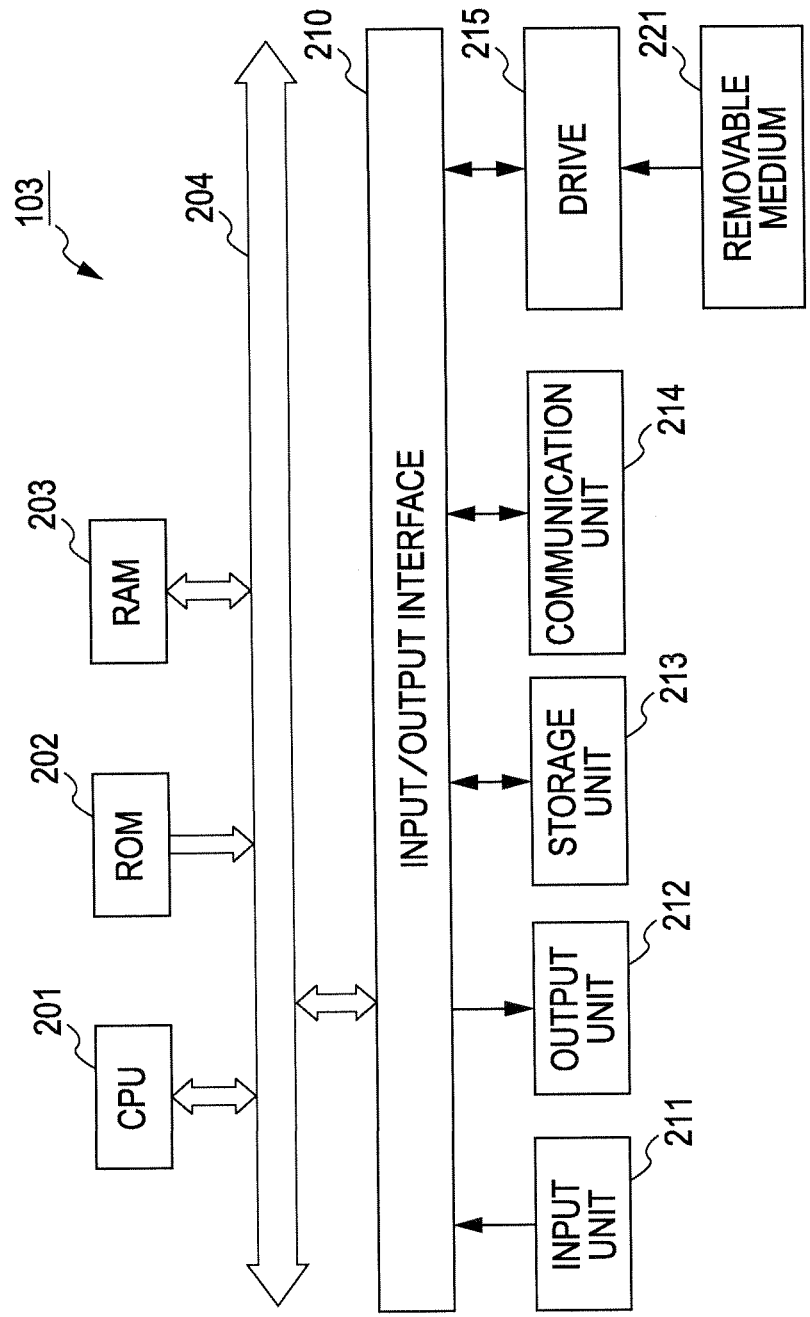
FIG. 4 is a block diagram showing a major configuration example of a remote client shown in FIG. 1.

The configuration of devices included in the converter system 100 will be described next. FIG. 4 is a block diagram showing a major configuration example of hardware of the remote client shown in FIG. 1.

As shown in FIG. 4, the remote client 103 has a CPU (central processing unit) 201, which executes various types of processing in accordance with a program stored in a ROM (read only memory) 202 or a program loaded from a storage unit 213 into a RAM (random access memory) 203. The RAM 203 also stores, for example, data that the CPU 201 uses to execute various types of processing, as appropriate.

The CPU 201, the ROM 202, and the RAM 203 are interconnected through a bus 204. An input/output interface 210 is also connected to the bus 204.

An input unit 211, an output unit 212, the storage unit 213, and a communication unit 214 are connected to the input/output interface 210. The input unit 211 includes a keyboard, a mouse, and so on. The output unit 212 includes, for example, a display, such as a CRT (cathode ray tube) display or an LCD (liquid crystal display), and a speaker. The storage unit 213 includes a hard disk, an SSD (solid-state drive), or the like. The communication unit 214 includes a modem, a wired LAN (local area network) interface, a wireless LAN interface, or the like. The communication unit 214 performs processing for communication through the network 102 including, for example, the Internet.

A drive 215 is further connected to the input/output interface 210, as appropriate. A removable medium 221 on which a computer program is recorded is loaded into the drive 215, as appropriate, and the computer program read therefrom is installed on the storage unit 213, as appropriate. Examples of the removable medium 221 include a magnetic disk, an optical disk, a magneto-optical disk, and a semiconductor memory.

Figure 5:
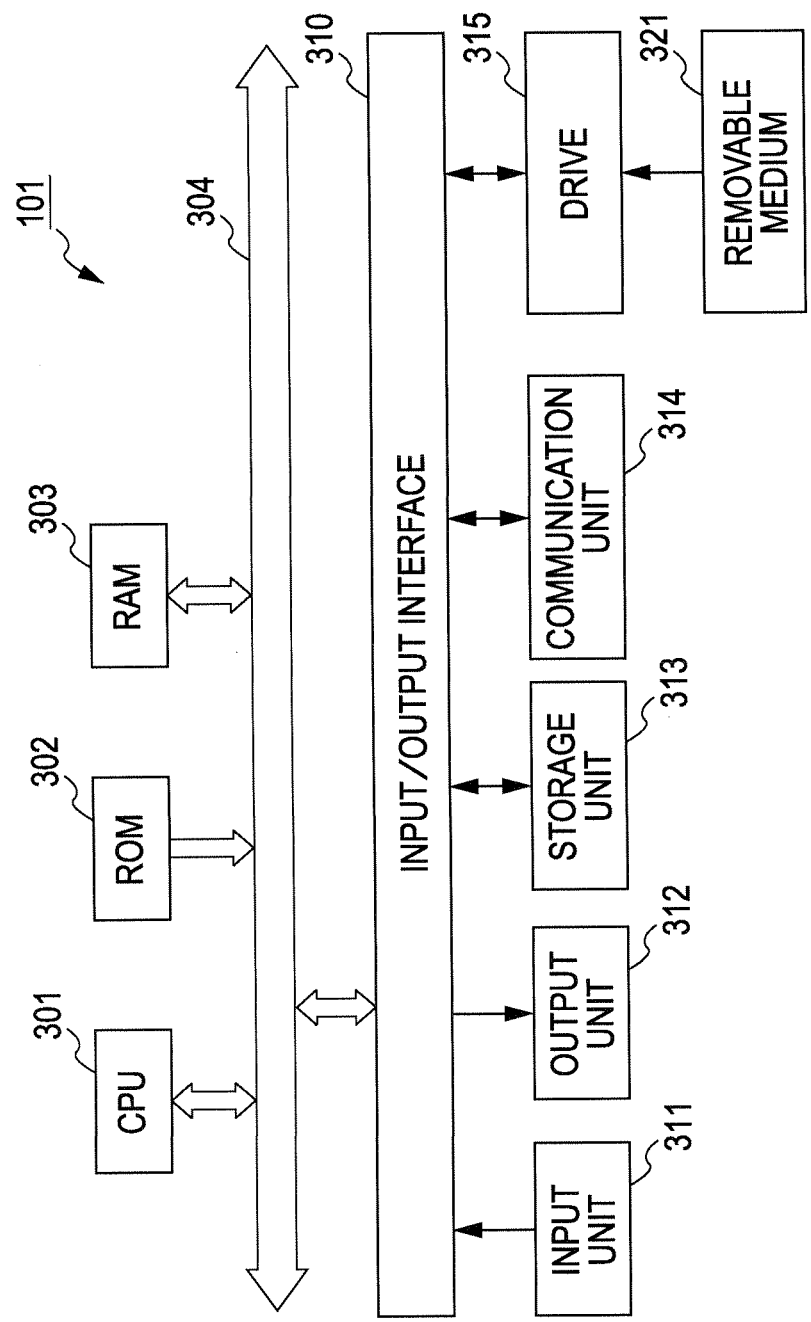
FIG. 5 is a block diagram showing a major configuration example of a multi-format transcoder shown in FIG. 1.

FIG. 5 is a block diagram showing a major configuration example of hardware of the multi-format transcoder shown in FIG. 1.

As shown in FIG. 5, the multi-format transcoder 101 has a configuration that is basically the same as that of the remote client 103 shown in FIG. 4. More specifically, the multi-format transcoder 101 includes a CPU 301 corresponding to the CPU 201, a ROM 302 corresponding to the ROM 202, a RAM 303 corresponding to the RAM 203, and a bus 304 corresponding to the bus 204. The multi-format transcoder 101 further includes an input/output interface 310 corresponding to the input/output interface 210, an input unit 311 corresponding to the input unit 211, an output unit 312 corresponding to the output unit 212, a storage unit 313 corresponding to the storage unit 213, a communication unit 314 corresponding to the communication unit 214, and a drive 315 corresponding to the drive 215. A removable medium 321 corresponding to the removable medium 221 is loaded into the drive 315.

The remote client 103 and the multi-format transcoder 101 may have configurations other than those described above.

[Functional Block of Converter System]

Figure 6:
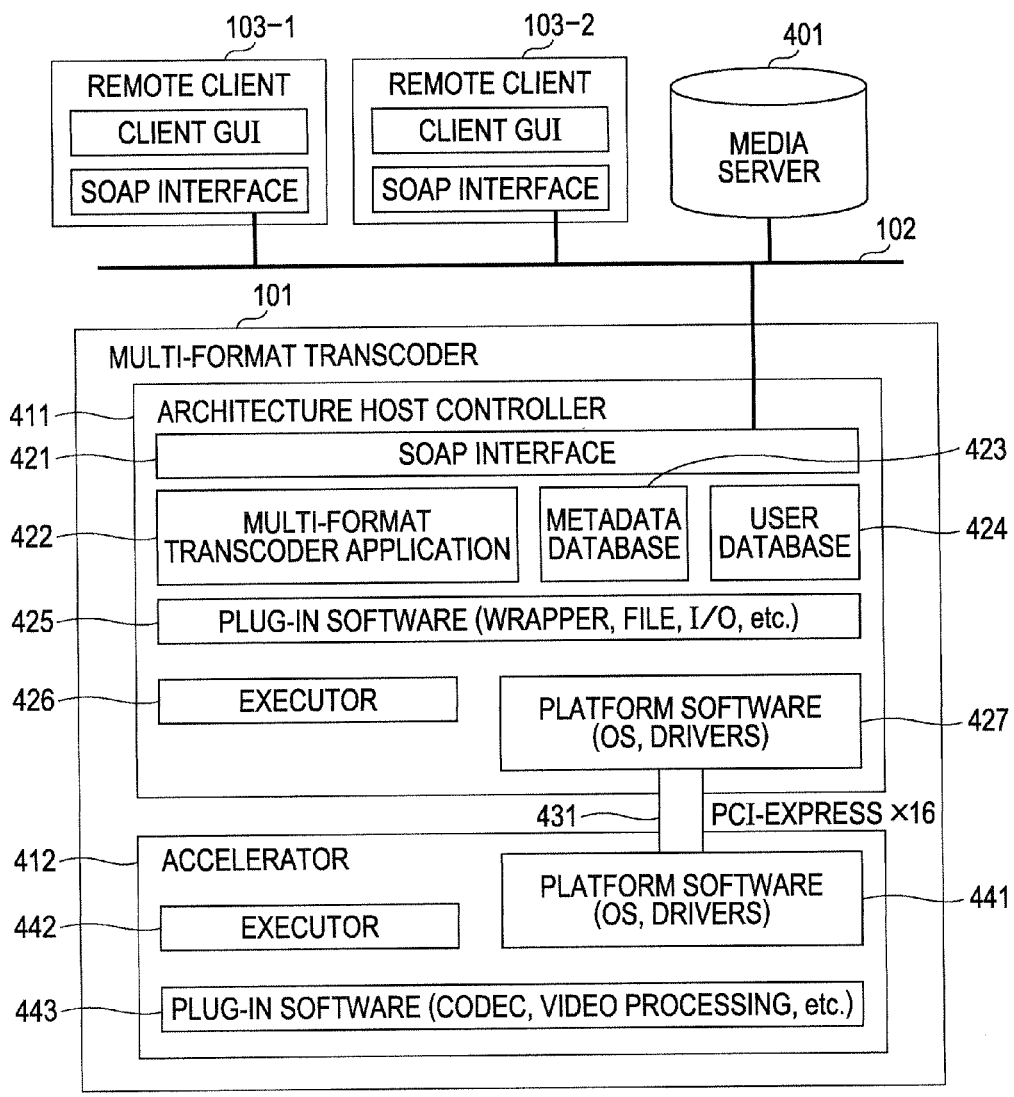
FIG. 6 is a functional block diagram illustrating functions of devices.

Functions of the individual devices will be described next. FIG. 6 is a functional block diagram illustrating the functions of the devices.

As shown in FIG. 6, each remote client 103 has a client GUI, which is a function for displaying a GUI for allowing the user to control the multi-format transcoder 101, and a SOAP interface, which has a function for communicating with the multi-format transcoder 101.

The multi-format transcoder 101 has an architecture host controller 411 and an accelerator 412. The architecture host controller 411 controls conversion processing. Under the control of the architecture host controller 411, the accelerator 412 actually performs conversion processing.

The architecture host controller 411 has a SOAP interface 421, which has a function for communicating with the remote clients 103 through the network 102. The architecture host controller 411 has a multi-format transcoder application 422, which realizes various functions of the multi-format transcoder 101.

The architecture host controller 411 further has a metadata database 423, which manages metadata of files, and a user database 424, which manages information regarding transcoding.

The architecture host controller 411 further has plug-in software 425 for wrapper, file input/output (I/O), etc. The plug-in software 425 is executed as appropriate, upon execution of application software.

The architecture host controller 411 further has an executor 426 for executing various types of processing for application software and so on.

The architecture host controller 411 further has platform software 427 on which an OS (operating system), drivers, etc.

The platform software 427 of the architecture host controller 411 operates in cooperation with platform software 441 of the accelerator 412 through a bus 431, such as a PCI-Express x16 bus.

The accelerator 412 has an executor 442 and plug-in software 443 for codec, video processing, etc. The executor 442 executes a task specified by the architecture host controller 411. Upon execution of the task, the plug-in software 443 is executed as appropriate.

That is, the architecture host controller 411 performs communication with the remote clients 103, generation and management of tasks for transcoding and other processing, and so on, and the accelerator 412 executes the tasks generated by the architecture host controller 411. The architecture host controller 411 also generates and manages information regarding transcoding.

The architecture host controller 411 and the accelerator 412 may be realized by physically separated CPUs, may be realized by different cores or threads in a single CPU, or may be realized in a time-divided manner in a single core.

As shown in FIG. 6, it is assumed that a media server 401 that stores clip files is also connected to the network 102. That is, the multi-format transcoder 101 stores and manages part or all of file storage-destination addresses, metadata, and so on, but does not store (manage) the files per se. Needless to say, the files may also be stored in the architecture host controller 411.

[Database]

Figure 7:
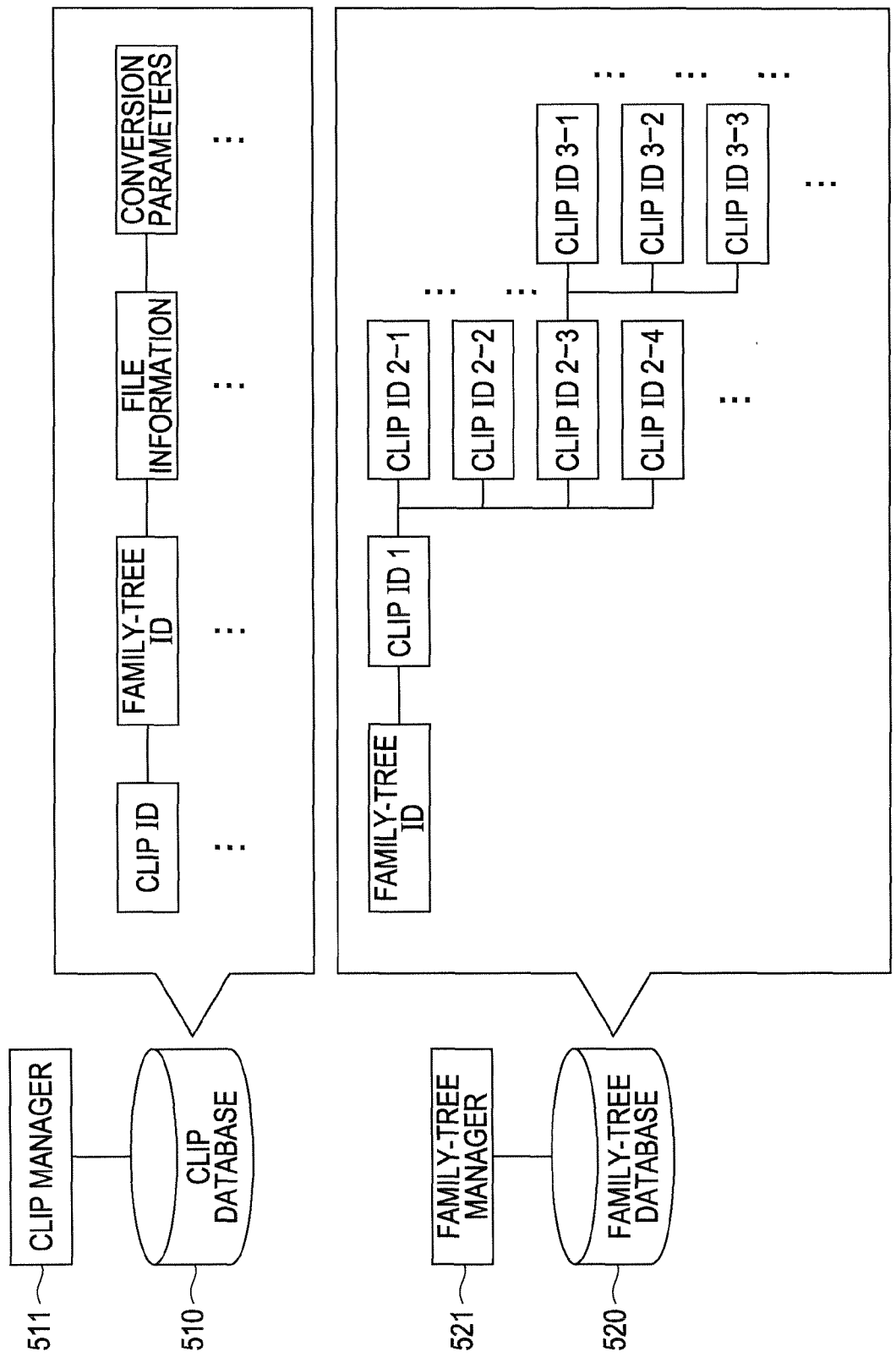
FIG. 7 is a diagram illustrating an example of the structure of a user database.

Information managed by the multi-format transcoder 101 will be described next. The multi-format transcoder 101 (particularly, the architecture host controller 411) compiles the conversion management information (i.e., information regarding transcoding) into a database, and manages the database as the user database 424. FIG. 7 is a diagram illustrating an example of the structure of the user database.

The conversion management information indicates history of conversion processing and indicates an identity of each clip created by the conversion processing. The conversion management information contains clip information, which includes information regarding clips, and family-tree information, which indicates a family tree representing a conversion hierarchy.

The architecture host controller 411 compiles the clip information and the family-tree information into corresponding databases. Thus, the user database 424 is constituted by a clip database 510 that is a database for clip information, a clip manager 511 for managing input/output of the clip information, a family-tree database 520 that is a database for the family-tree information, and a family-tree manager 521 that manages input/output of the family-tree information.

As shown in FIG. 7, the clip information registered in the clip database 510 includes a clip ID (clip identification information) that is identification information of a clip, a family-tree ID (family-tree identification information) that is identification information of a family tree to which the clip belongs, metadata of the clip, file information including information about each file belonging to the clip, and conversion parameters including a setting value and so on used in transcoding performed to create the clip.

Needless to say, the clip information may contain any other information. The clip database 510 contains clip information, as described above, for each clip. In other words, as a result of registration of the clip information in the clip database 510, the clip (content) is registered in the multi-format transcoder 101.

As shown in FIG. 7, in family-tree information registered in the family-tree database 520, for example, a family-tree ID and clip IDs of clips belonging to the family tree are associated with each other, so as to express the inter-clip relationships (the structure of the family tree).

In the case of the example shown in FIG. 7, a clip ID 1 of an original (an earliest ancestor) clip is associated with a family-tree ID representing the entire family tree, clip IDs 2-1 to 2-4 which are identification information of clips created from the clip with clip ID 1 are associated with the clip ID 1, and clip IDs 3-1 to 3-3 which are identification information of clips created from the clip with clip ID 2-3 are associated with the clip ID 2-3.

In such a manner, in the family-tree information, the clip IDs of clips are associated with each other so as to represent the conversion hierarchy of the clips, so that a family tree of the clip IDs is formed. That is, the family-tree information contains information indicating, for example, which clip is created from a particular clip, which clip is to be used to create a particular clip, or which clip is the original (the earliest ancestor) clip.

This clip information will now be described in more detail. FIG. 8 illustrates an example of the clip information registered in the clip database.

As shown in FIG. 8, the clip information contains clip metadata including information regarding the clip and information (a file path) indicating the locations of files belonging to the clip.

In the case of the example shown in FIG. 8, the clip metadata includes a clip name, owner, time stamp, video size, frame rate, encoding parameters, codec (encoding scheme), bitrate (encoding bitrate), source (parent) file path (the file path of a pre-conversion file (parent file)), related metadata file path (the file path of metadata of the clip), clip ID, family-tree ID, and transcoding parameters (conversion parameters) used in transcoding.

In the example of FIG. 8, the clip information includes media [video] file path (video-data file path), media [proxy] file path (proxy-data file path), thumbnail file path (thumbnail-data file path), and media [audio] file path (audio-data file path).

Needless to say, the clip information may contain any other information.

Which clip is created from a particular clip and how it is created can be easily understood from both of the clip information and the family-tree information. Since the presence/absence of a file can also be determined from the clip information, it is possible to easily recognize whether or not a clip can be created, which clip is to be used to create the clip if it can be created, and so. In addition, it is possible to easily recognize whether or not a deleted clip can be recovered and which clip is to be used to create the clip if it is recoverable.

The multi-format transcoder 101 generates such conversion management information, supplies the conversion management information to the user for use, thereby improving the user convenience of transcoding.

[Generation of Conversion Management Information]

Figure 9:
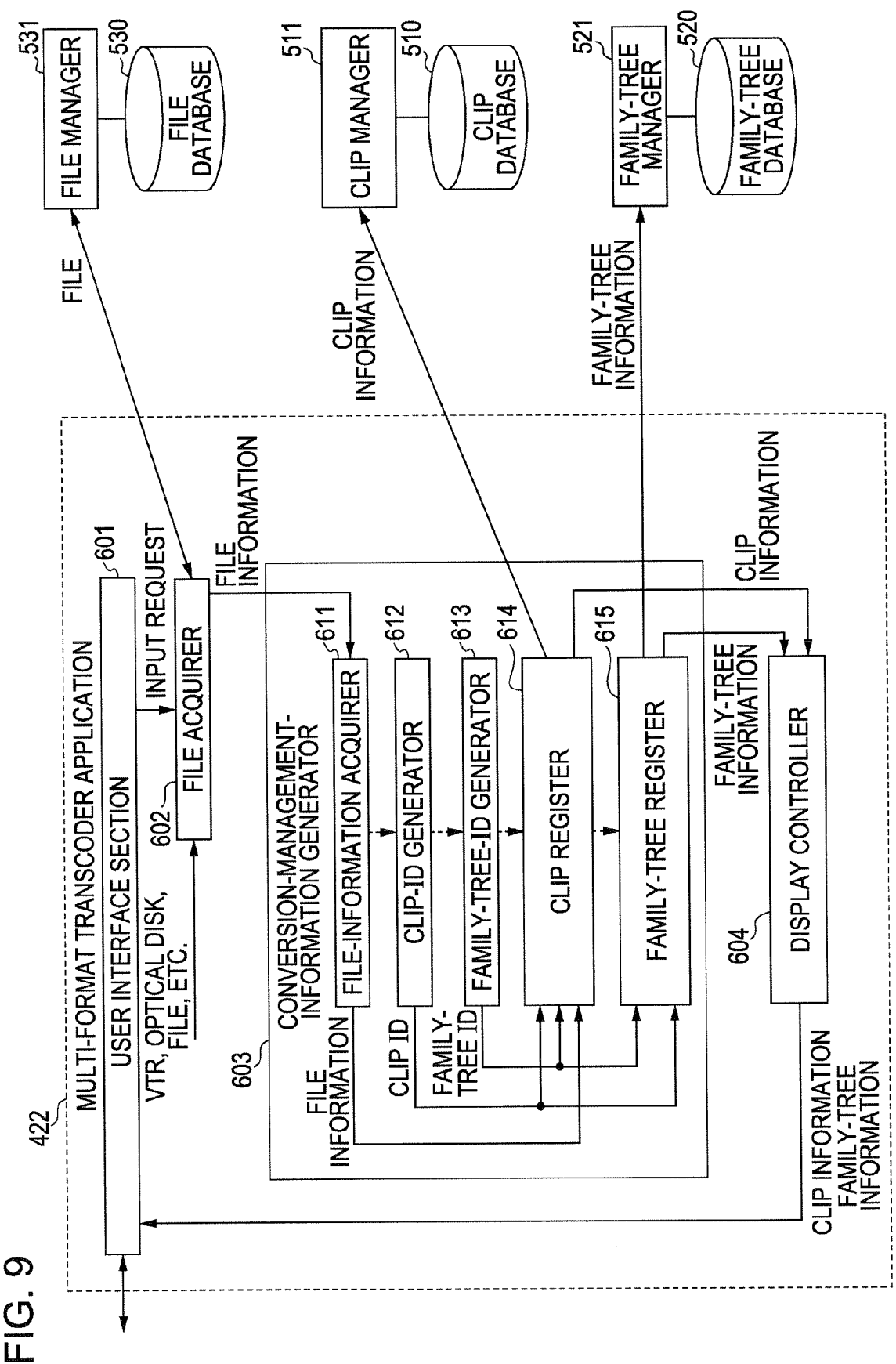
FIG. 9 is a block diagram showing an example of major functional blocks involved in generation of conversion management information.

Generation of such conversion management information will be described next. FIG. 9 is a diagram showing an example of major functional blocks involved in generation of the conversion management information. The functional blocks shown in FIG. 9 are realized by execution of the multi-format transcoder application 422.

As shown in FIG. 9, the multi-format transcoder 101 has, as the functional blocks involved in generation of the conversion management information, a user interface section 601, a file acquirer 602, a conversion-management-information generator 603, and a display controller 604.

For example, through exchange of information with the remote client 103 via the SOAP interface 421, the user interface section 601 receives a content input (registration) request from the user and supplies the clip information and the family-tree information.

On the basis of the input request obtained via the user interface section 601, the file acquirer 602 performs an ingest processing to extract content from a medium, such as a VTR or an optical disk, and to convert the extracted content into a file, supplies the file to a file manager 531 provided on the media server 401, and causes the file to be registered in a file database 530, which is a file management database.

On the basis of the input request, the file acquirer 602 can acquire a clip file and can supply the file to the file manager 531 so as to cause the file to be registered in the file database 530.

The file acquirer 602 further supplies file information, which is information (e.g., metadata) regarding the file registered in the file database 530, to the conversion-management-information generator 603.

On the basis of the file information supplied from the file acquirer 602, the conversion-management-information generator 603 generates conversion management information regarding a clip of the file registered in the file database 530 by the file acquirer 602.

The conversion-management-information generator 603 has a file-information acquirer 611, a clip-ID generator 612, a family-tree-ID generator 613, a clip register 614, and a family-tree register 615.

The file-information acquirer 611 acquires the file information from the file acquirer 602 and supplies the file information to the clip register 614. The clip-ID generator 612 generates a clip ID for a clip corresponding to the file information acquired by the file-information acquirer 611 and supplies the generated clip ID to the clip register 614 and the family-tree register 615. The family-tree-ID generator 613 generates a family-tree ID for a family tree in which the clip corresponding to the file information acquired by the file-information acquirer 611 is the original (the earliest ancestor) and supplies the family-tree ID to the clip register 614 and the family-tree register 615.

The clip register 614 uses the file information, the clip ID, and the family-tree ID, supplied from the corresponding file-information acquirer 611, the clip-ID generator 612, and the family-tree-ID generator 613, to generate clip information and supplies the clip information to the clip manager 511, so as to cause the clip information to be registered in the clip database 510. Consequently, the clip to which the file registered in the file database 530 by the file acquirer 602 belongs is managed by the multi-format transcoder 101.

The clip register 614 also supplies the generated clip information to the display controller 604.

The family-tree register 615 uses the clip ID and the family-tree ID, supplied from the corresponding clip-ID generator 612 and the family-tree-ID generator 613, to generate family-tree information and supplies the family-tree information to the family-tree manager 521, so as to cause the family-tree information to be registered in the family-tree database 520. Consequently, a family tree in which the clip to which the file registered in the file database 530 by the file acquirer 602 belongs is the original (the earliest ancestor) is registered in the family-tree database 520.

The family-tree register 615 also supplies the generated family-tree information to the display controller 604.

The display controller 604 supplies the clip information and the family-tree information, supplied from the corresponding clip register 614 and the family-tree register 615, to the remote client 103 via the user interface section 601 so as to display the clip information and the family-tree information.

When a new clip is input and registered in the manner described above, the clip information of the clip is generated and is registered in the clip database 510 and a family tree in which the clip is the original (the earliest ancestor) is generated and is registered in the family-tree database 520.

Figure 10:
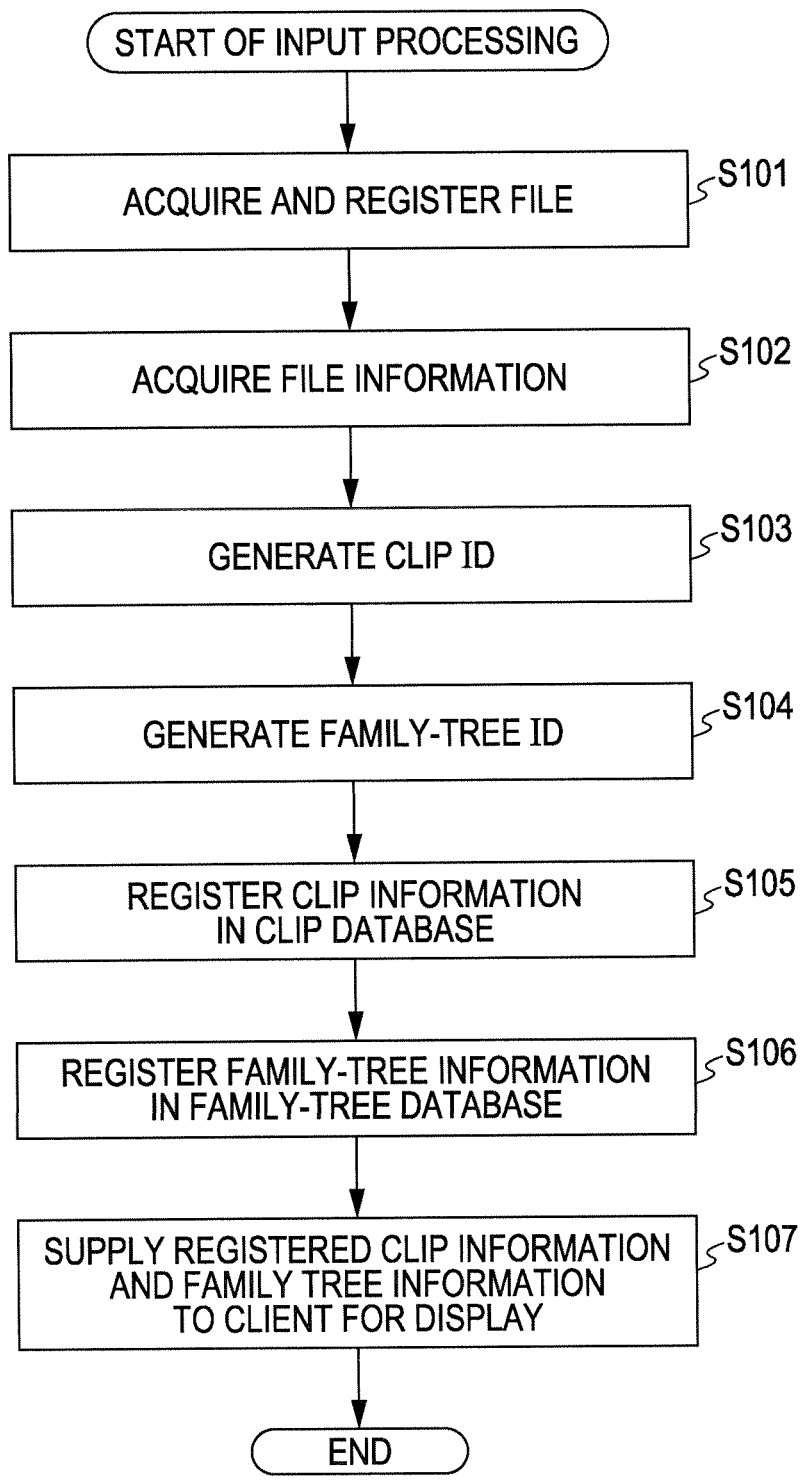
FIG. 10 is a flowchart illustrating an example of a flow of input processing.

An example of a flow of input processing performed during input of a clip in the manner described above will now be described with reference to a flowchart shown in FIG. 10.

When the user interface section 601 obtains, from the remote client 103, a clip input request from the user, the input processing is started. Upon start of the input processing, in step S101, the file acquirer 602 acquires a file and registers the file in the file database 530.

In step S102, the file-information acquirer 611 acquires file information of the file (the input clip) registered by the file acquirer 602.

In step S103, the clip-ID generator 612 generates a clip ID for the input clip. In step S104, the family-tree-ID generator 613 generates a family-tree ID for the input clip. In step S105, the clip register 614 generates clip information of the input clip and registers the clip information in the clip database 510. In step S106, the family-tree register 615 generates family-tree information of a family tree in which the input clip is the original (the earliest ancestor) and registers the generated family-tree information in the family-tree database 520.

In step S107, the display controller 604 supplies the clip information, registered in the clip database 510, and the family-tree information, registered in the family-tree database 520, to the remote client 103, so as to display the clip information and the family-tree information. Upon completion of the processing in step S107, the input processing ends.

Figure 11A:
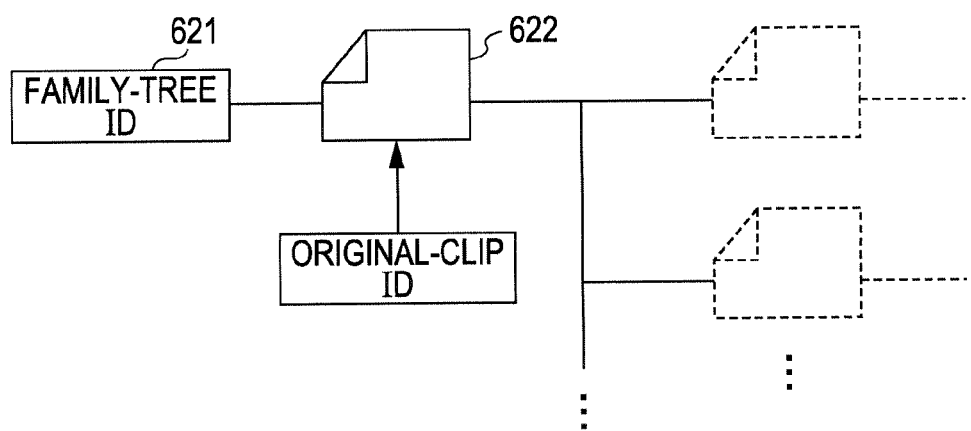
FIGS. 11A and 11B are diagrams illustrating an example of how a family tree is created.

As a result of the input processing performed as described above, a family tree in which the input clip is the original (the earliest ancestor) is registered as shown in FIG. 11A. At this point, since transcoding has not been performed on the input clip yet, only a node that exists in the family tree is the original (the earliest ancestor) input clip. That is, in this family tree, only a clip ID 622 of the input clip is associated with a family-tree ID 621.

When the input clip is one extracted from a storage medium (e.g., a removable medium) other than the multi-format transcoder 101 and converted into a file through an ingest processing, a truly original (earliest ancestor) clip is the storage medium (or content recorded thereon).

Figure 11B:
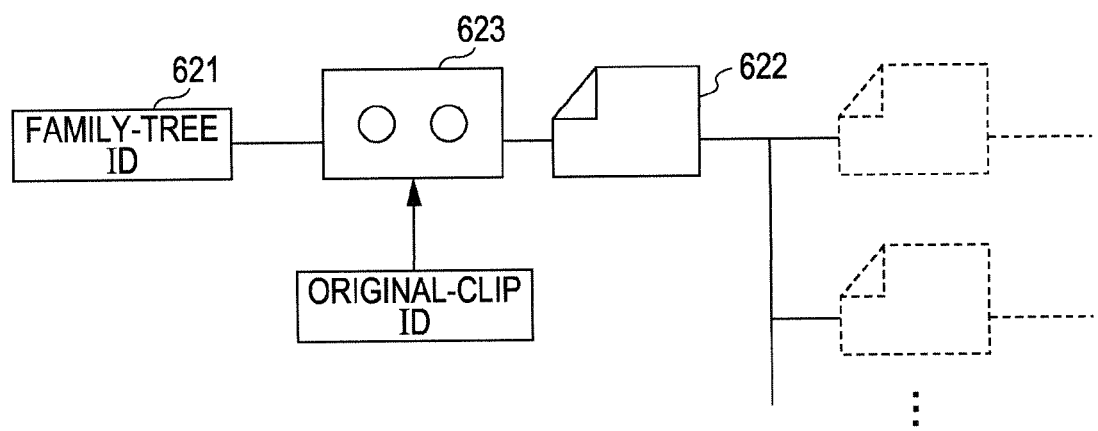

Thus, in this case, as shown in FIG. 11B, the clip ID of the original (the earliest ancestor) clip is assigned to a storage medium 623. As shown in FIG. 11B, in the family tree, the clip ID assigned to the storage medium 623 is associated with the family-tree ID 621 and the clip ID 622 of the input clip is associated below the storage medium 623. In this case, the clip ID assigned to the storage medium 623 may be any information that identifies the storage medium 623, and thus, when identification information has already been assigned to the storage medium 623, the identification information may be used as the clip ID.

As described above, with respect to an input clip, the multi-format transcoder 101 generates clip information and family-tree information and registers the generated information. Thus, by simply inputting (registering) a clip, the user can easily manage, as a family tree, the conversion hierarchy in which the clip is the original (the earliest ancestor).

[Update of Conversion Management Information]

Figure 12:
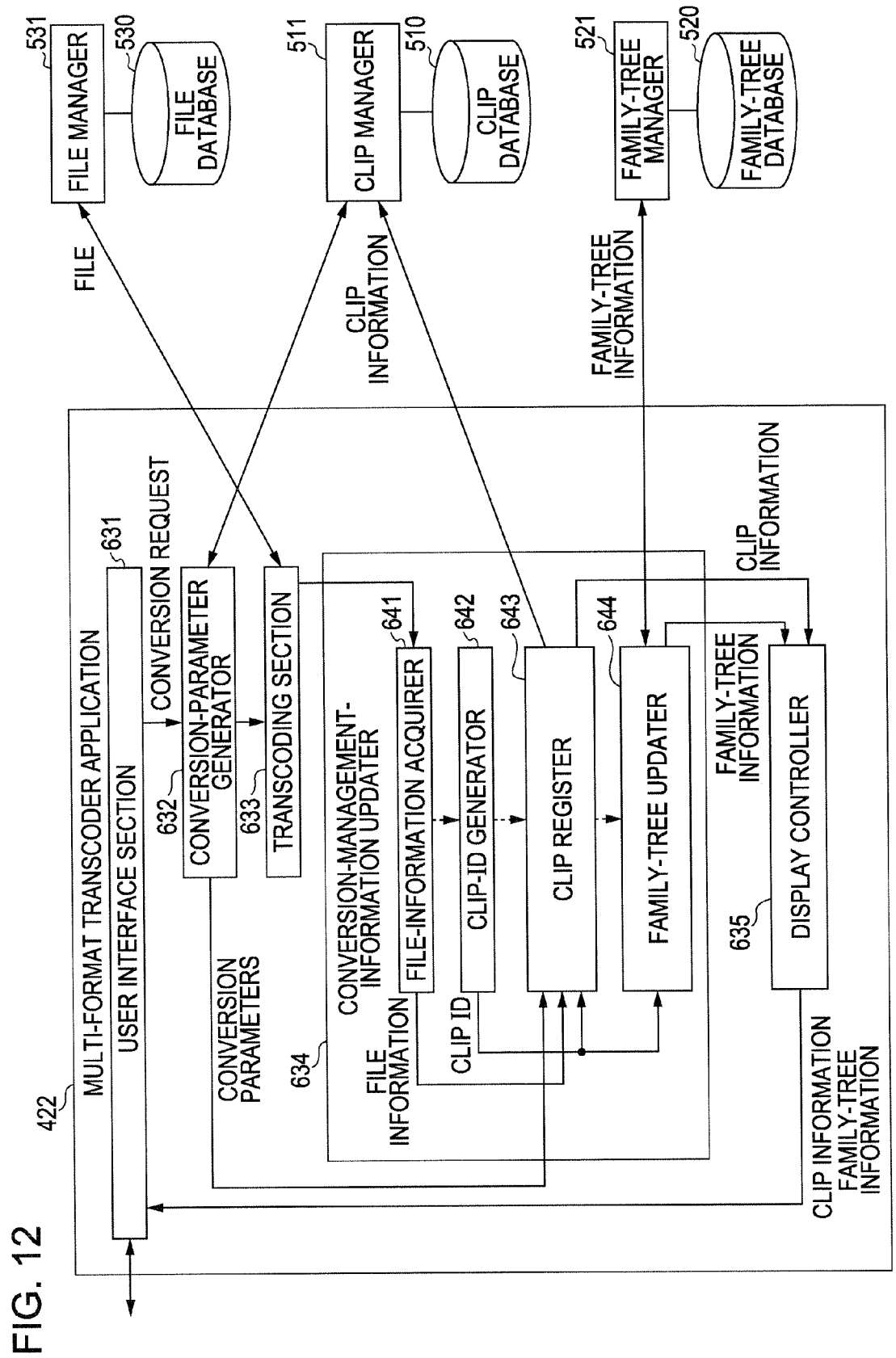
FIG. 12 is a block diagram showing an example of major functional blocks involved in update of the conversion management information.

When the clip registered as described above is transcoded, the conversion management information is updated and information regarding the transcoding is added thereto. FIG. 12 is a diagram showing an example of major functional blocks involved in update of the conversion management information. The functional blocks shown in FIG. 12 are realized by execution of the multi-format transcoder application 422.

As shown in FIG. 12, the multi-format transcoder 101 has, as the functional blocks involved in update of the conversion management information, a user interface section 631, a conversion-parameter generator 632, a transcoding section 633, a conversion-management-information updater 634, and a display controller 635.

For example, through exchange of information with the remote client 103 via the SOAP interface 421, the user interface section 631 receives a transcoding instruction (a conversion request) or the like from the user and supplies the clip information and the family-tree information.

In accordance with the conversion request obtained via the user interface section 601, the conversion-parameter generator 632 generates conversion parameters to be used in transcoding. More specifically, the conversion-parameter generator 632 obtains the clip information from the clip database 510 via the clip manager 511, as appropriate, and uses the clip information to generate conversion parameters. The conversion-parameter generator 632 supplies the generated conversion parameters to the transcoding section 633 and the conversion-management-information updater 634.

The transcoding section 633 uses the supplied conversion parameters to transcode the clip. On the basis of the conversion request, the transcoding section 633 obtains, from the file database 530 via the file manager 531, a file of a clip that serves as a conversion source. Using the conversion parameters, the transcoding section 633 transcodes the conversion-source file to create a new clip. The transcoding section 633 supplies a file of the new clip resulting from the transcoding (the clip may hereinafter be referred to as a "post-conversion clip") to the file manager 531, so as to cause the file to be registered in the file database 530. The transcoding section 633 also supplies the file information of the post-conversion clip to the conversion-management-information updater 634.

The conversion-management-information updater 634 reflects, in the conversion management information, a result of the transcoding performed by the transcoding section 633. The conversion-management-information updater 634 has a file-information acquirer 641, a clip-ID generator 642, a clip register 643, and a family-tree updater 644.

The file-information acquirer 641 acquires the file information of the clip created by the transcoding performed by the transcoding section 633 and supplies the file information to the clip register 643. The clip-ID generator 642 generates a clip ID for the clip created by the transcoding performed by the transcoding section 633 and supplies the clip ID to the clip register 643 and the family-tree updater 644.

The clip register 643 uses the conversion parameters, the file information, and the clip ID, supplied from the corresponding conversion-parameter generator 632, the file-information acquirer 641, and the clip-ID generator 642, to generate clip information of the clip created by the transcoding performed by the transcoding section 633 and supplies the clip information to the clip manager 511 so as to cause the clip information to be registered in the clip database 510. Consequently, the clip information of the post-conversion clip is registered in the clip database 510.

The clip register 643 also supplies the generated clip information to the display controller 635.

The family-tree updater 644 obtains, from the family-tree database 520 via the family-tree manager 521, the family-tree information of a family tree to which the conversion-source clip belongs, and then adds the clip ID, supplied from the clip-ID generator 642, to the family-tree information as a new node. That is, the family-tree updater 644 updates the family tree (the family-tree information) by associating, in the family tree, the clip ID of the post-conversion clip with the clip ID of the conversion-source clip. The family-tree updater 644 supplies the updated family-tree information to the family-tree manager 521 so as to cause the family-tree information to be registered in the family-tree database 520. As a result, the family-tree information registered in the family-tree database 520 is updated and a result of the transcoding is reflected in the family-tree database 520.

The family-tree updater 644 also supplies the updated family-tree information to the display controller 635.

The display controller 635 supplies the clip information and the family-tree information, supplied from the corresponding clip register 643 and the family-tree updater 644, to the conversion-requesting remote client 103 via the user interface section 601 so as to cause the clip information and the family-tree information to be displayed as a result of the transcoding.

When transcoding is performed on an existing clip in the manner described above, the clip information of a post-conversion clip is generated and registered in the clip database 510 and the post-conversion clip is added to the family tree to which the conversion-source clip belongs (i.e., the family tree is updated).

An example of a flow of conversion processing as described above will now be described with reference to a flowchart shown in FIG. 13.

When the user interface section 631 obtains, from the remote client 103, a conversion request from the user, the conversion processing is started. Upon start of the conversion processing, in step S121, on the basis of the conversion request, the conversion-parameter generator 632 generates conversion parameters indicating how the format of a specified clip is to be converted.

Upon generation of the conversion parameters, in step S122, on the basis of the conversion parameters, the transcoding section 633 performs transcoding to convert the format of the specified clip into a specified format, thereby creating a new clip.

In step S123, the file-information acquirer 641 acquires file information (metadata and so on) of the post-conversion clip. In step S124, the clip-ID generator 642 generates a clip ID for the post-conversion clip. In step S125, the clip register 643 registers clip information of the post-conversion clip in the clip database 510. In step S126, the family-tree updater 644 adds, as a new node, the post-conversion clip to a family tree to which the conversion-source clip belongs.

In step S127, the display controller 635 supplies the clip information and the family-tree information of the post-conversion clip (i.e., registration information of the clip and an update result of the family tree) to the conversion-requesting remote client 103 so as to cause the clip information and the family-tree information to be displayed as a result of the transcoding.

Upon completion of the processing in step S127, the conversion processing ends.

Figure 14A:
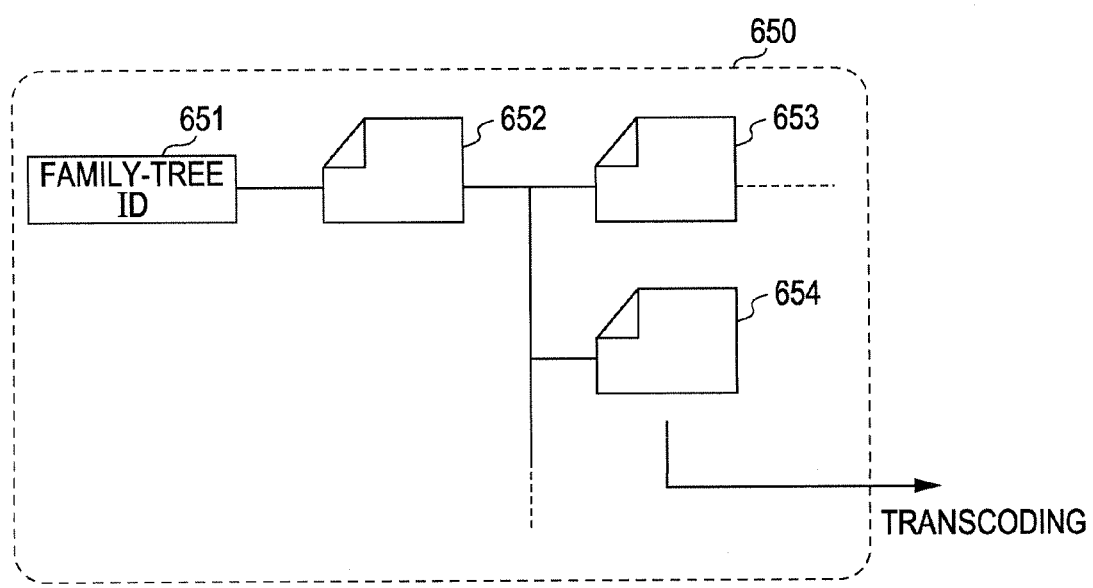
FIGS. 14A and 14B are diagrams illustrating an example of how a family tree is updated.
Figure 14B:
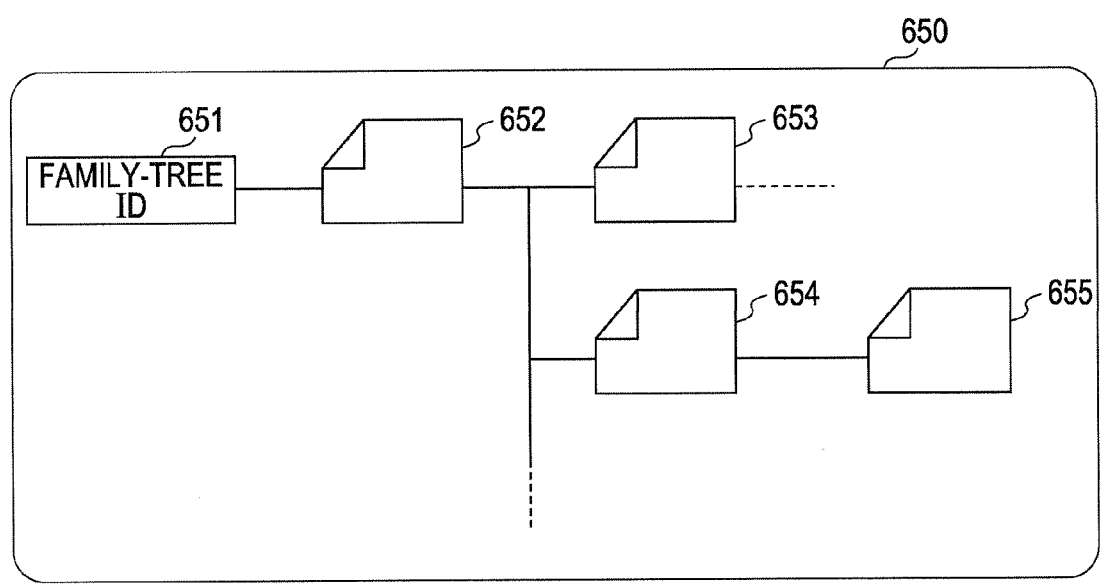

For example, when a conversion request is given for a clip 654 belonging to a family tree 650 with family-tree ID 651, as shown in FIG. 14A, a post-conversion clip 655 is added below the clip 654, as shown in FIG. 14B.

When transcoding is performed in such a manner, a post-conversion clip is linked to a conversion-source clip in the family tree. That is, the family tree is updated so as to reflect the result of the transcoding.

By generating and updating the conversion management information in the manner described above, the multi-format transcoder 101 not only can transcode the format of a clip but also can manage the history of the transcoding. In other words, the multi-format transcoder 101 can manage an identity of each clip created by the transcoding.

Consequently, by referring to the family tree, the user can easily understand which clip is created from a particular clip. In addition, since the clip information of each clip is also registered and the conversion parameters are also included in the clip information, the user can easily recognize how the conversion was performed by referring to the clip information.

Consequently, the user can easily and correctly perform processing, such as retrieval and recovery, on a desired clip, by referring to and using the conversion management information.

The multi-format transcoder 101 also has a function associated with use of the conversion management information generated/updated as described above. This function will be described below in detail.

[Display of Conversion Management Information]

For example, as the function for using the conversion management information, the multi-format transcoder 101 allows the conversion management information (the family tree and the clip information) to be displayed on the monitor of the remote client 103.

Figure 15:
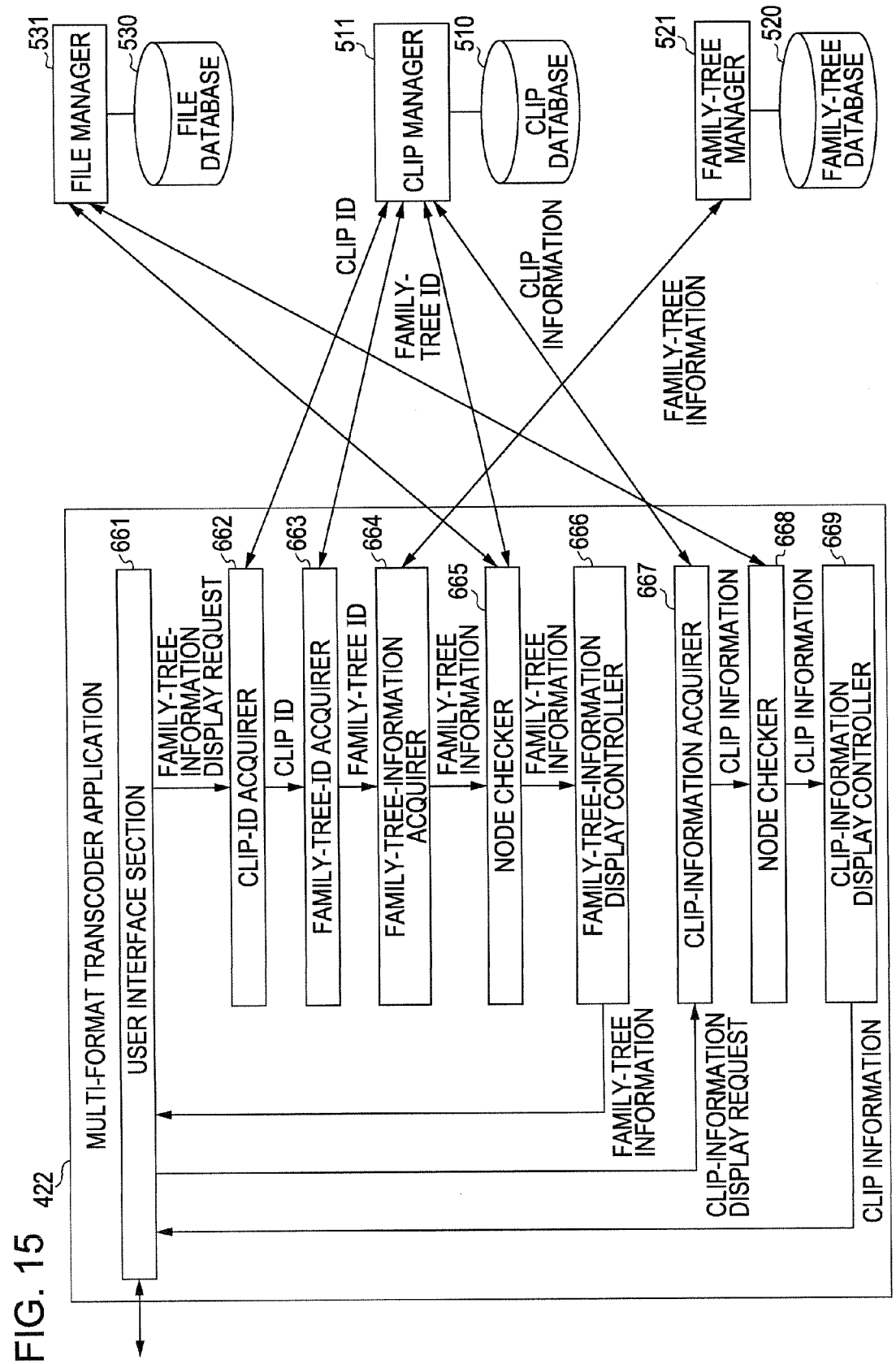
FIG. 15 is a block diagram showing an example of major functional blocks involved in display of the conversion management information.

FIG. 15 is a diagram showing an example of major functional blocks involved in display of the conversion management information. The functional blocks shown in FIG. 15 are realized by execution of the multi-format transcoder application 422.

As shown in FIG. 15, the multi-format transcoder 101 has, as functional blocks involved in display of the conversion management information, a user interface section 661, a clip-ID acquirer 662, a family-tree-ID acquirer 663, a family-tree-information acquirer 664, a node checker 665, a family-tree-information display controller 666, a clip-information acquirer 667, a node checker 668, and a clip-information display controller 669.

For example, through exchange of information with the remote client 103 via the SOAP interface 421, the user interface section 661 receives a family-tree-information display request and a clip-information display request from the user and supplies the clip information and the family-tree information.

The family-tree-information display request is given to request displaying of a family tree and specifies the family tree to be displayed. The family tree may be specified in any manner, for example, may be specified by a family-tree ID or may be specified by information (e.g., a clip ID or file information) regarding a clip belonging to an intended family tree.

When the family tree is specified by information regarding a clip, the clip-ID acquirer 662 accesses the clip manager 511 to acquire, from the clip database 510, a clip ID corresponding to the information. The clip-ID acquirer 662 supplies the acquired clip ID to the family-tree-ID acquirer 663.

When a clip ID is supplied as information specifying the family tree, the clip-ID acquirer 662 supplies the clip ID to the family-tree-ID acquirer 663. When a family-tree ID is supplied as the information specifying the family tree, the clip-ID acquirer 662 supplies the family-tree ID to the family-tree-ID acquirer 663.

The family-tree-ID acquirer 663 accesses the clip manager 511, as appropriate, to acquire, from the clip database 510, the family-tree ID of the family tree specified by the family-tree-information display request. For example, when a clip ID is supplied from the clip-ID acquirer 662, the family-tree-ID acquirer 663 acquires, from the clip database 510, the family-tree ID of a family tree including the clip with the clip ID (i.e., of a family tree specified by the family-tree-information display request).

For example, when a family-tree ID is supplied as information specifying the family tree, the family-tree-ID acquirer 663 supplies the family-tree ID to the family-tree-ID acquirer 664.

The family-tree-information acquirer 664 accesses the family-tree manager 521 to acquire, from the family-tree database 520, family-tree information corresponding to the family-tree ID supplied from the family-tree-ID acquirer 663. That is, the family-tree-information acquirer 664 acquires family-tree information of the family tree for which the family-tree-information display request was issued. The family-tree-information acquirer 664 supplies the acquired family-tree information to the node checker 665.

The node checker 665 checks the presence of files with respect to all clip IDs included in the family-tree information supplied from the family-tree-information acquirer 664. The node checker 665 accesses the clip manager 511 to check all of file paths included in the clip information of the clip IDs included in the family-tree information. The node checker 665 accesses the file manager 531 to check validity of each file path (i.e., presence of files on each file path). The node checker 665 performs the file-presence checking on all clip IDs included in the family-tree information. The node checker 665 supplies the family-tree information and a result of the file-presence checking to the family-tree-information display controller 666.

The family-tree-information display controller 666 supplies the supplied family-tree information and the result of the file-presence checking to the display-requesting remote client 103 via the user interface section 601, so as to cause the family-tree information and the result of the file-presence checking are displayed as a family tree.

For example, the user refers to the displayed family tree and specifies a node (clip) in the family tree to give a request for displaying the clip information thereof. The remote client 103 supplies the clip ID of the specified clip to the multi-format transcoder 101 in conjunction with a clip-information display request.

Upon receiving the clip-information display request via the user interface section 661, the clip-information acquirer 667 accesses the clip manager 511 to acquire, from the clip database 510, clip information corresponding to the clip ID specified by the clip-information display request. The clip-information acquirer 667 supplies the acquired clip information to the node checker 668.

The node checker 668 accesses the file manager 531 to check validities of the file paths included in the clip information supplied from the clip-information acquirer 667 (i.e., to check the presence of files on each file path). The node checker 668 supplies the clip information and a result of the file-presence checking to the clip-information display controller 669.

The clip-information display controller 669 supplies the supplied clip information and the result of the file-presence checking to the display-requesting remote client 103 via the user interface section 601, so as to display the clip information and the result of the file-presence checking.

As described above, the multi-format transcoder 101 can supply the family-tree information and the clip information on the basis of the user request. With this arrangement, the remote client 103 can easily display the family tree and the clip information. Thus, the user can easily check the family tree and the clip information.

Figure 16:
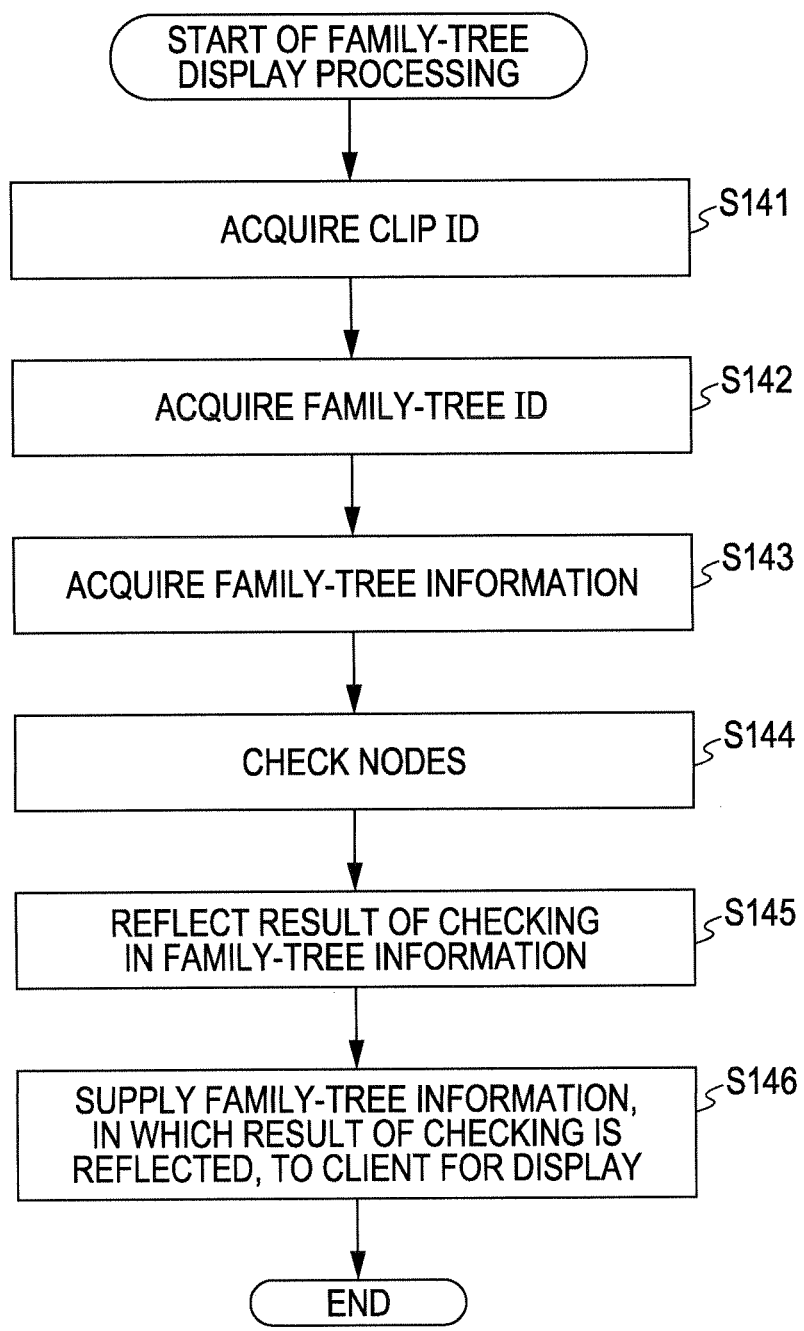
FIG. 16 is a flowchart illustrating an example of a flow of family-tree display processing.

An example of a flow of family-tree display processing as described above will now be described with reference to a flowchart shown in FIG. 16.

When the user interface section 661 acquires, from the remote client 103, a family-tree-information display request from the user, the family-tree display processing is started. Upon start of the family-tree display processing, in step S141, the clip-ID acquirer 662 acquires the clip ID of a clip specified by the family-tree-information display request. When a family tree is specified by a family-tree ID or a clip ID, the processing in step S141 is skipped and the process proceeds to step S142.

In step S142, the family-tree-ID acquirer 663 acquires the family-tree ID of a family tree to be displayed. When the family tree is specified by a family-tree ID, the processing in step S142 is skipped and the process proceeds to step S143.

In step S143, the family-tree-information acquirer 664 acquires the family-tree information of the family tree to be displayed. In step S144, the node checker 665 checks the presence of all files of nodes in the family tree to be displayed. In step S145, the node checker 665 reflects a result of the file-presence checking in the family-tree information.

In step S146, the family-tree-information display controller 666 supplies the family-tree information, in which the result of the checking is reflected, to the remote client 103, so as to cause the family-tree information to be displayed as a family tree.

Upon completion of the processing in step S146, the family-tree display processing ends.

Figure 17:
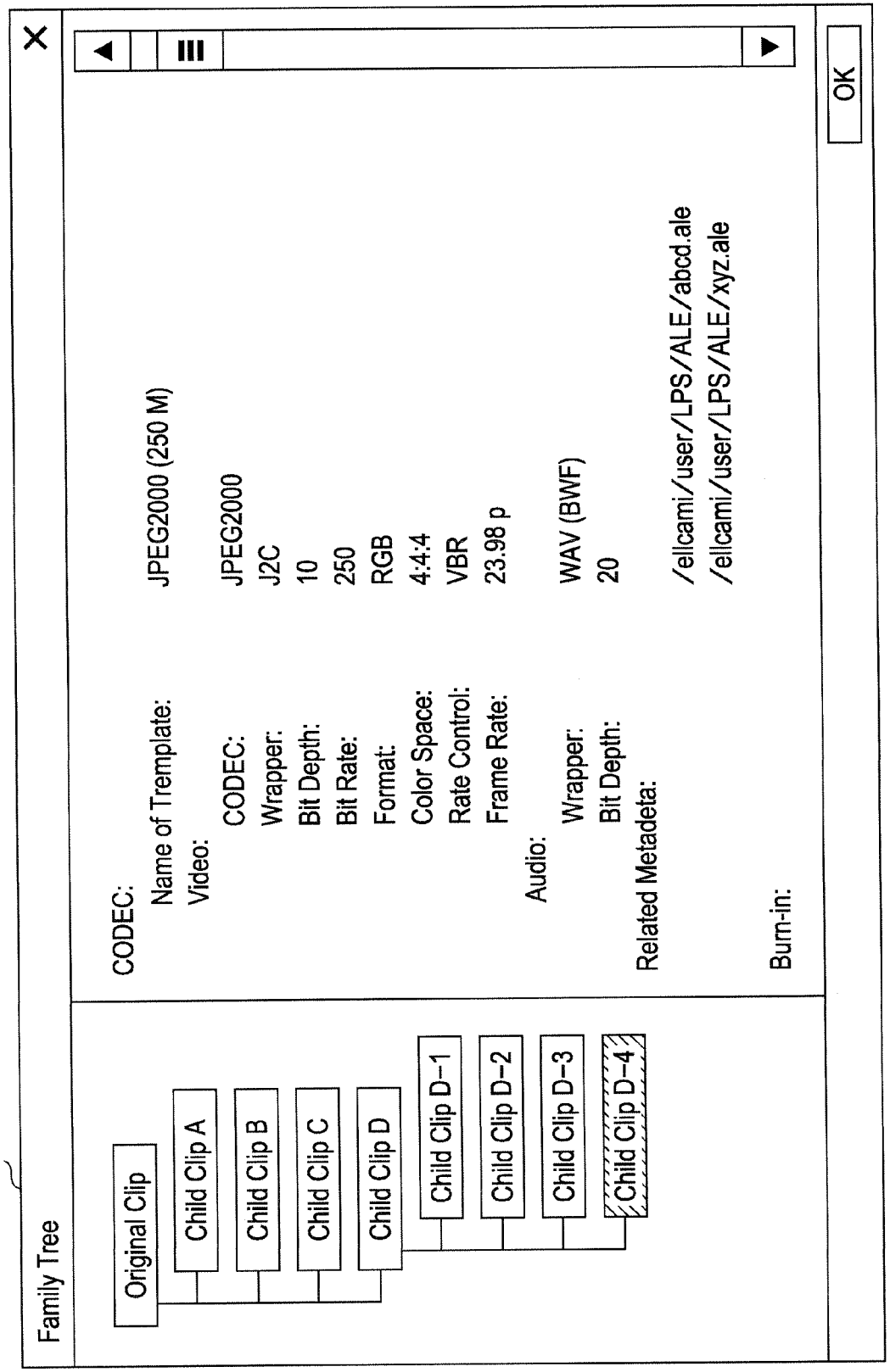
FIG. 17 is a flowchart illustrating an example of display of a GUI of a client.

When the family-tree information (and the result of the file-presence checking) is supplied in family-tree display processing as described above, the remote client 103 displays, for example, a GUI as shown in FIG. 17.

An image 671 shown in FIG. 17 is a GUI image showing a family tree. The area of the image 671 is divided into a left area and a right area. The left area shows a family tree representing a conversion hierarchy.

In the example shown in FIG. 17, the family tree displayed in the image 671 indicates that the original (the earliest ancestor) clip is transcoded four times to create four child clips A, B, C, and D, and the child clip D is further transcoded four times to create four child clips D-1, D-2, D-3, and D-4.

As illustrated, in the family tree, pre-conversion and post-conversion clip relationships (parent-child relationships) are indicated by lines. Thus, the user can easily recognize the structure of the conversion hierarchy. For example, a clip whose a file is deleted may be expressed by varying the color and/or density of a corresponding node in the family tree. With this arrangement, the user can easily recognize whether or not a file of a desired clip exists. The user can easily and correctly recognize, for example, whether or not a desired clip can be recovered and whether or not which clip is to be used therefor if it is recoverable.

Needless to say, any method may be used to express the family tree.

For example, through selection of a node in the family tree displayed in the image 671, the user can give a request for displaying part of all of the clip information of the clip indicated by the node.

The request given in such a manner is supplied from the remote client 103 to the multi-format transcoder 101.

Figure 18:
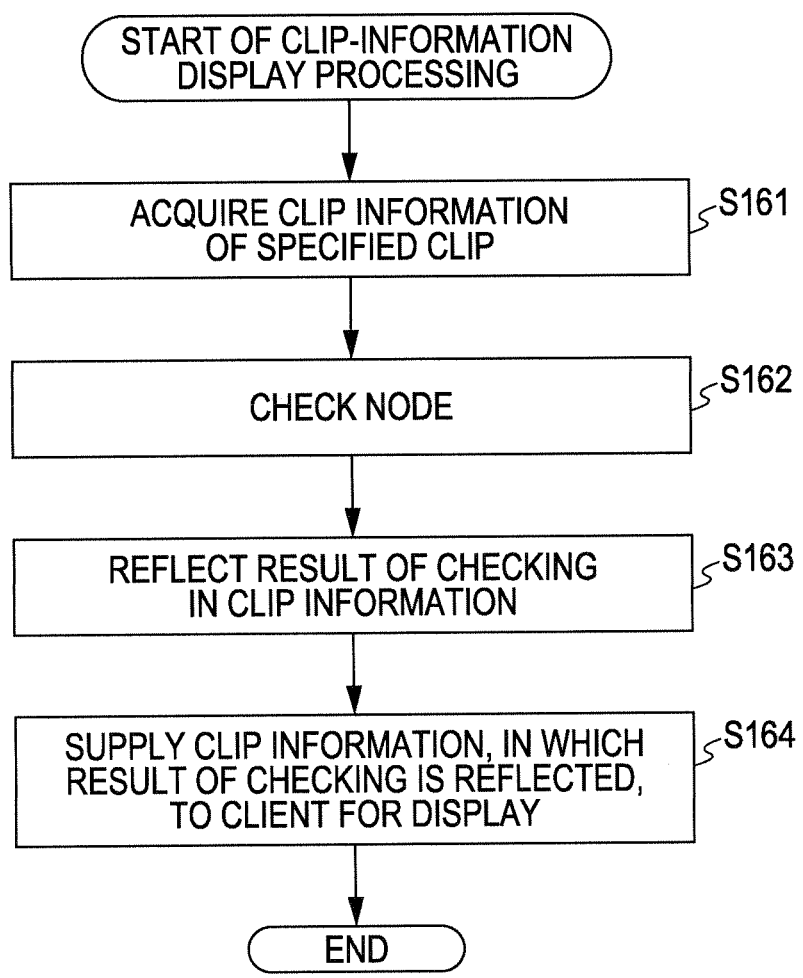
FIG. 18 is a flowchart illustrating an example of a flow of clip-information display processing.

An example of a flow of clip-information display processing that the multi-format transcoder 101 performs in response to such a request will now be described with reference to a flowchart shown in FIG. 18.

When the user interface section 661 obtains, from the remote client 103, a clip-information display request from the user, the clip-information display processing is started. Upon start of the clip-information display processing, in step S161, the clip-information acquirer 667 acquires the clip information of a clip specified by the clip-information display request.

In step S162, the node checker 668 checks the presence of files in the obtained clip information (the specified node). In step S163, the node checker 668 reflects a result of the file-presence checking in the clip information.

In step S164, the clip-information display controller 669 supplies the clip information, in which the result of the checking is reflected, to the remote client 103, so as to display the clip information.

Upon completion of the processing in step S164, the clip-information display processing ends.

When the clip information (and the result of the file-presence checking) is supplied in clip-information display processing as described above, the remote client 103 displays, for example, the clip information in the right area in the image 671 shown in FIG. 17. That is, the clip information of a node, included in the family tree displayed in the right area, selected by the user is displayed in the right area.

Thus, the user can easily refer to information regarding a desired clip.

[Retrieval of Original Clip]

For example, the multi-format transcoder 101 has, as the function for using the conversion management information, a capability to retrieve the original (the earliest ancestor) clip in a family tree to which a certain clip belongs and supply the information of the retrieved original clip to the user via the remote client 103.

Figure 19:
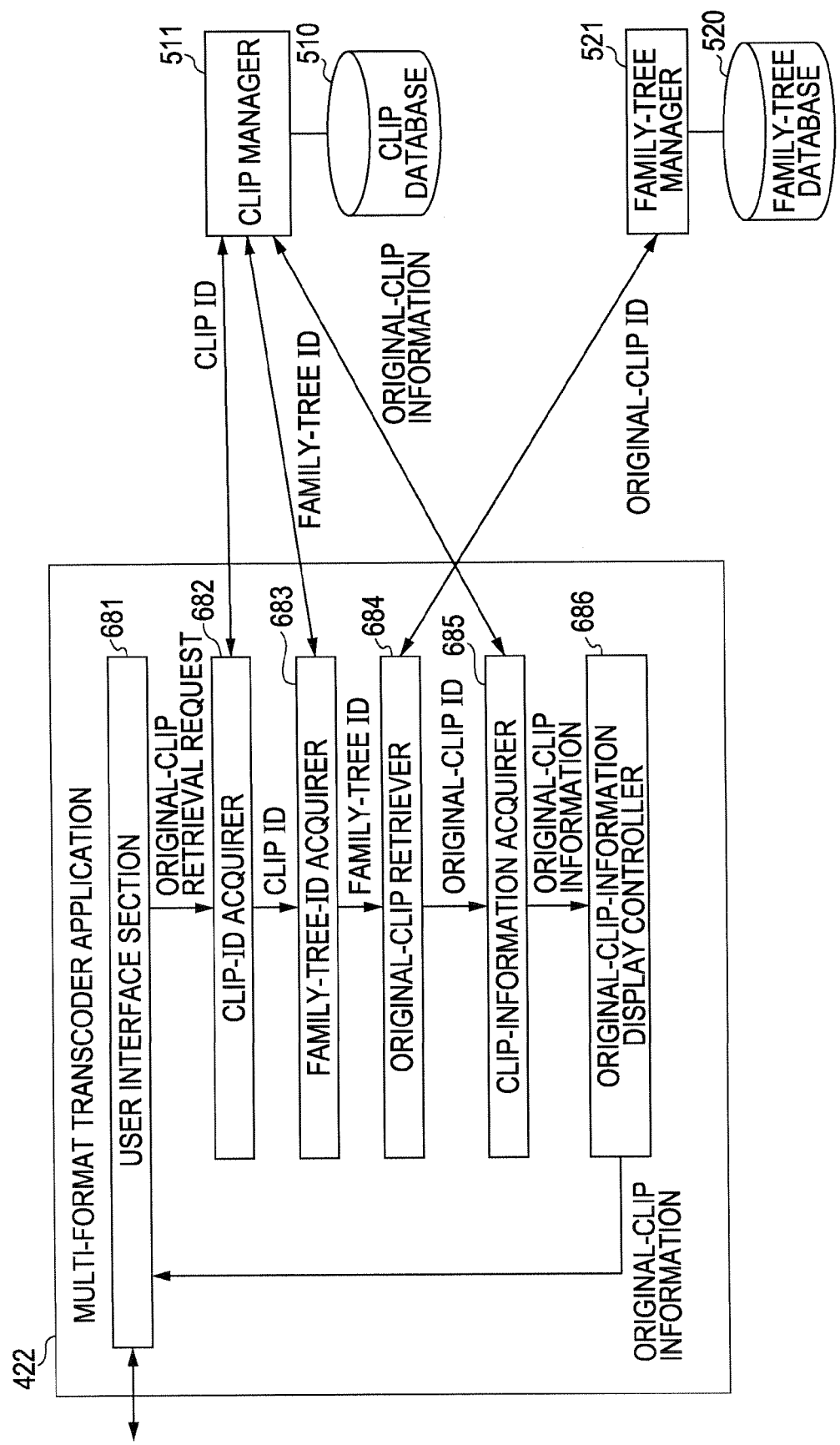
FIG. 19 is a diagram showing an example of major functional blocks involved in retrieval of an original clip.

FIG. 19 is a diagram showing an example of major functional blocks involved in retrieval of the original clip. The functional blocks shown in FIG. 19 are realized by execution of the multi-format transcoder application 422.

As shown in FIG. 19, the multi-format transcoder 101 has, as the functional blocks involved in retrieval of the original clip, a user interface section 681, a clip-ID acquirer 682, an family-tree-ID acquirer 683, an original-clip retriever 684, a clip-information acquirer 685, and an original-clip-information display controller 686.

Through exchange of information with the remote client 103 via the SOAP interface 421, the user interface section 661 receives an original-clip retrieval request from the user and supplies the clip information of the original clip (i.e., original-clip information).

The original-clip retrieval request is given to request retrieval of the original clip and specifies a clip or a family tree. When a clip is specified, the original clip in a family tree to which the specified clip belongs is retrieved. When a family tree is specified, the original clip in the family tree is retrieved. The clip may be specified in any manner and is specified by, for example, a clip ID or file information. Similarly, the family tree may be specified in any manner and is specified by, for example, a family-tree ID.

When a clip is specified by the original-clip retrieval request, the clip-ID acquirer 682 acquires the clip ID of the clip from the clip database 510 via the clip manager 511. The clip-ID acquirer 682 supplies the acquired clip ID to the family-tree-ID acquirer 683. When a clip is specified by a clip ID in the original-clip retrieval request, the clip-ID acquirer 682 supplies the clip ID to the family-tree-ID acquirer 683. When a family tree is specified by the original-clip retrieval request, the clip-ID acquirer 682 supplies the original-clip retrieval request to the family-tree-ID acquirer 683.

When a clip ID is supplied from the clip-ID acquirer 682, the family-tree-ID acquirer 683 acquires, from the clip database 510 via the clip manager 511, the family-tree ID of a family tree to which the clip with the clip ID belongs. The family-tree-ID acquirer 683 supplies the acquired family-tree ID to the original-clip retriever 684. When a family tree is specified by the original-clip retrieval request, the family-tree-ID acquirer 683 supplies the family-tree ID, included in the original-clip retrieval request, to the original-clip retriever 684.

The original-clip retriever 684 accesses the family-tree manager 521 to retrieve, in the family-tree database 520, the original clip in the family tree with the family-tree ID supplied from the family-tree-ID acquirer 683 and obtains the clip ID of the original clip (i.e., the original-clip ID). Upon obtaining the original-clip ID, the original-clip retriever 684 supplies the original-clip ID to the clip-information acquirer 685.

The clip-information acquirer 685 accesses the clip manager 511 to acquire, from the clip database 510, the clip information of the clip (i.e., original-clip information) with the original-clip ID supplied from the original-clip retriever 684. The clip-information acquirer 685 supplies the acquired original-clip information to the original-clip-information display controller 686.

The original-clip-information display controller 686 supplies the original-clip information, supplied from the clip-information acquirer 685, to the retrieval-requesting remote client 103 via the user interface section 601, so as to display the original-clip information.

As described above, the multi-format transcoder 101 can supply the clip information of the original clip in a family tree to which a specified clip belongs or in a specified family tree. With this arrangement, the user can easily retrieve the original clip in a family tree to which a desired clip belongs or in a desired family tree and can easily check the clip information of the original clip.

Figure 20:
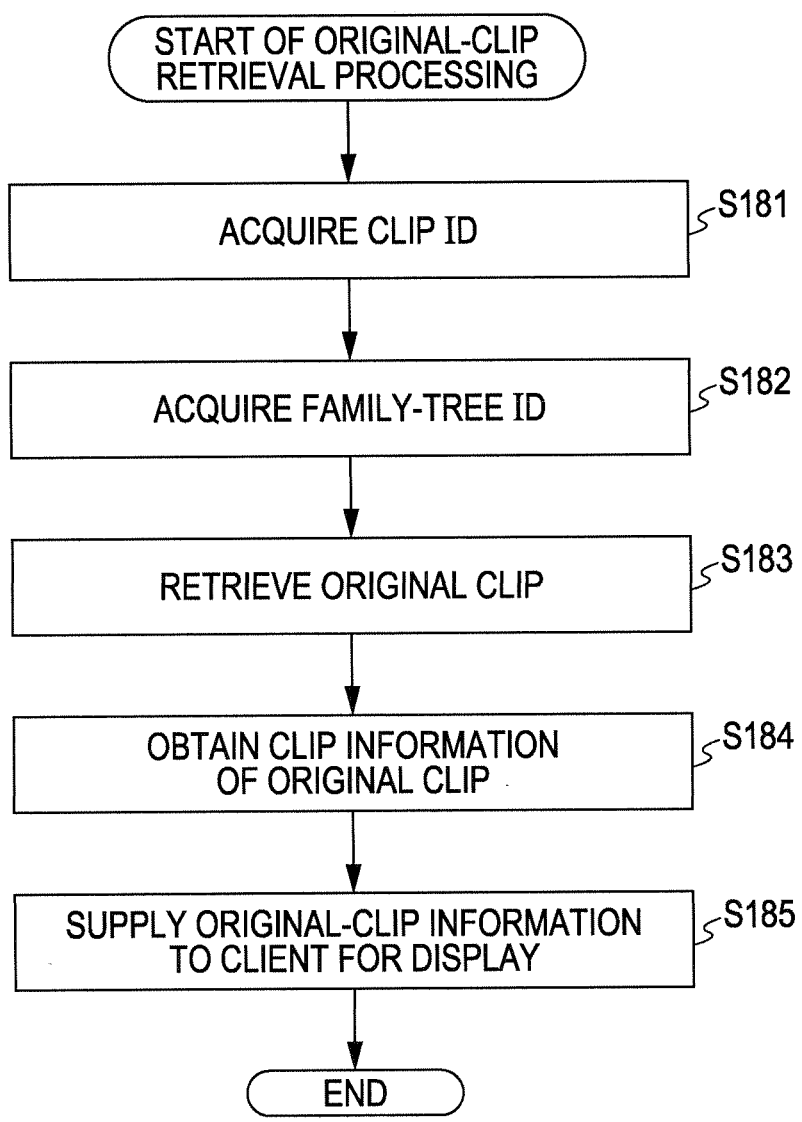
FIG. 20 is a flowchart illustrating an example of a flow of original-clip retrieval processing.

An example of a flow of original-clip retrieval processing as described above will now be described with reference to a flowchart shown in FIG. 20.

When the user interface section 681 obtains an original-clip retrieval request from the remote client 103, the original-clip retrieval processing is started. Upon start of the original-clip retrieval processing, in step S181, the clip-ID acquirer 682 acquires the clip ID of a clip specified by the original-clip retrieval request. When a clip is specified by a clip ID or when a family tree from which the original clip is to be retrieved is specified, the processing in step S181 is skipped and the process proceeds to step S182.

In step S182, the family-tree-ID acquirer 683 acquires the family-tree ID of a family tree from which the original clip is to be retrieved. When a family tree from which the original clip is to be retrieved is specified by a family-tree ID in the original-clip retrieval request, the processing in step S182 is skipped and the process proceeds to step S183.

In step S183, the original-clip retriever 684 retrieves the original clip in the specified family tree. In step S184, the original-clip retriever 684 obtains the clip information of the original clip (the original-clip information).

In step S185, the original-clip-information display controller 686 supplies the original-clip information to the remote client 103, so as to display the original-clip information.

Upon completion of the processing in step S185, the original-clip retrieval processing ends.

When the original-clip information is supplied in original-clip retrieval processing as described above, the remote client 103 displays the original-clip information.

Thus, the user can easily retrieve the original clip in a family tree to which a desired clip belongs or the original clip in a desired family tree. In addition, the user can easily refer to the clip information of the original clip.

[Recovery of Single Generation]

There are cases in which files of clips created by transcoding are deleted.

For example, the multi-format transcoder 101 has, as the function for using the conversion management information, a capability to recover a file of a desired deleted file by using a file of a parent clip of the deleted clip. In this case, the multi-format transcoder 101 uses the conversion management information to identify the parent clip (the conversion-source clip) of a clip whose file is to be recovered and re-transcodes the parent clip to recover the file of the desired clip.

Figure 21:
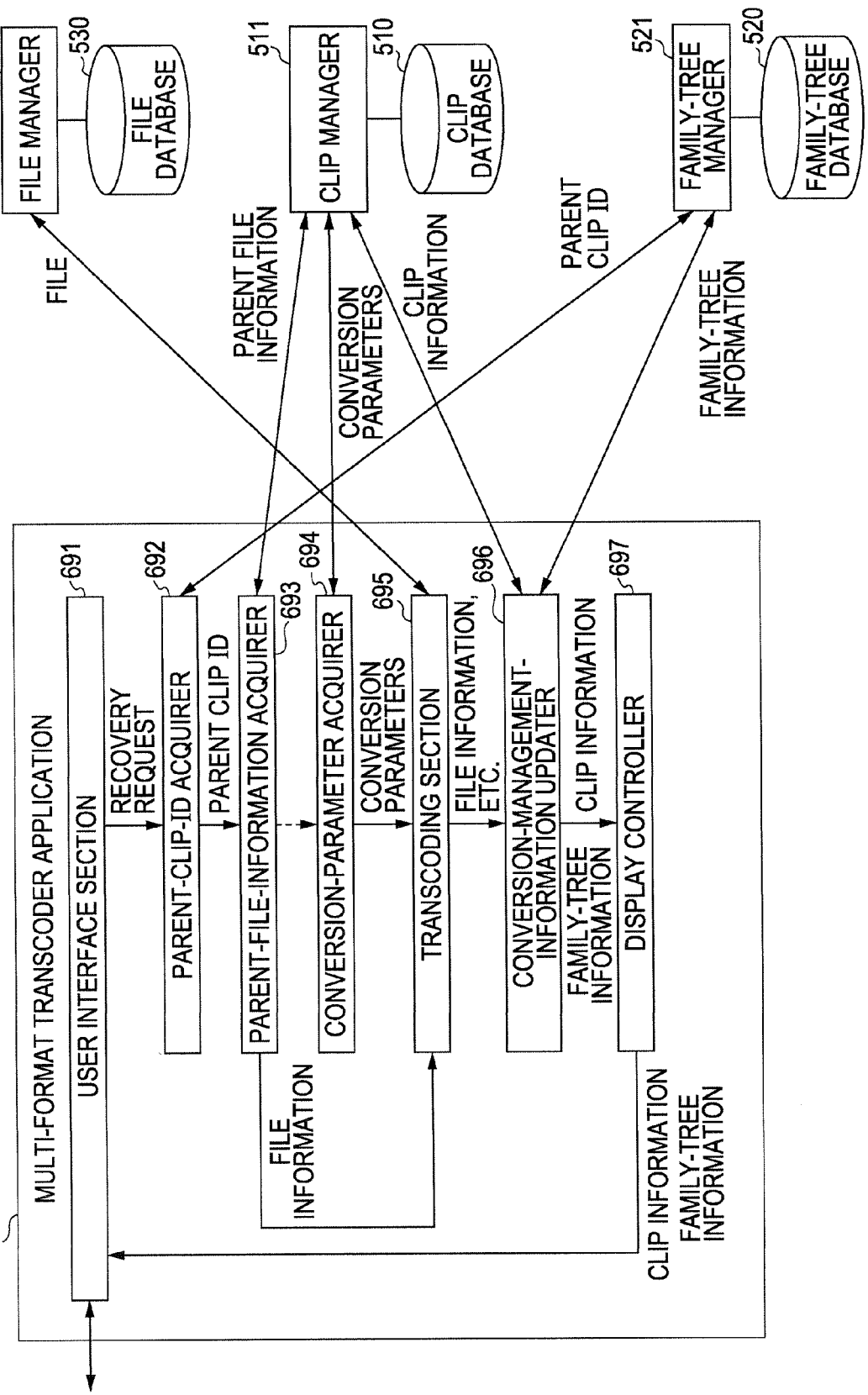
FIG. 21 is a diagram showing an example of major functional blocks involved in recovery of a clip.

FIG. 21 is a diagram showing an example of major functional blocks involved in recovery of a file. The functional blocks shown in FIG. 21 are realized by execution of the multi-format transcoder application 422.

As shown in FIG. 21, the multi-format transcoder 101 has, as the functional blocks involved in recovery of a file, a user interface section 691, a parent-clip-ID acquirer 692, a parent-file-information acquirer 693, a conversion-parameter acquirer 694, a transcoding section 695, a conversion-management-information updater 696, and a display controller 697.

For example, through exchange of information with the remote client 103 via the SOAP interface 421, the user interface section 691 receives a file recovery request and supplies the clip information of a recovered clip and family-tree information in which the processing of the recovery is reflected.

The recovery request of a file includes information (e.g., a clip ID) specifying a clip whose file is to be recovered. Through access to the family-tree manager 521, the parent-clip-ID acquirer 692 identifies a family tree to which the clip specified by the recovery request belongs and acquires, from the family-tree database 520, the clip ID (the parent-clip ID) of a parent clip of the clip to be recovered, on the basis of the family-tree information of the identified family tree. The parent-clip-ID acquirer 692 supplies the acquired parent-clip ID to the parent-file-information acquirer 693.

The parent-file-information acquirer 693 accesses the clip manager 511 to acquire, from the clip database 510, the file information (the parent file information) of the clip (the parent clip) with the parent-clip ID. The parent-file-information acquirer 693 supplies the acquired parent file information to the transcoding section 695.

Through access to the clip manager 511, the conversion-parameter acquirer 694 acquires, from the clip database 510, conversion parameters used in transcoding by which the clip whose file is to be recovered was generated, on the basis of the clip ID or the like specified by the recovery request. The conversion-parameter acquirer 694 supplies the acquired conversion parameters to the transcoding section 695.

Through access to the file manager 531, the transcoding section 695 uses the parent file information, supplied from the parent-file-information acquirer 693, to obtain the file of the parent clip from the file database 530.

By using the obtained file of the parent clip and the conversion parameters supplied from the conversion-parameter acquirer 694, the transcoding section 695 transcodes the parent file to recover the file of the clip specified by the recovery request. The transcoding section 695 supplies the recovered file of the clip to the file manager 531, so as to cause the recovered file to be registered in the file database 530. The transcoding section 695 also supplies the file information of the recovered clip and the conversion parameters used in the transcoding to the conversion-management-information updater 696.

The conversion-management-information updater 696 has a configuration that is basically the same as the configuration of the conversion-management-information updater 634 shown in FIG. 12, and performs processing that is similar thereto. That is, on the basis of information such as the supplied file information and conversion parameters, the conversion-management-information updater 696 updates the conversion management information to reflect the clip recovery in the conversion management information. The conversion-management-information updater 696 supplies, to the display controller 697, the updated family-tree information and the clip information of the clip whose file is recovered.

The display controller 697 supplies the family-tree information and clip information, supplied from the conversion-management-information updater 696, to the recovery-requesting remote client 103 via the user interface section 601 so as to display the family-tree information and the clip information.

Thus, by using the conversion management information, the multi-format transcoder 101 can easily recover a file of a specified clip.

Figure 22:
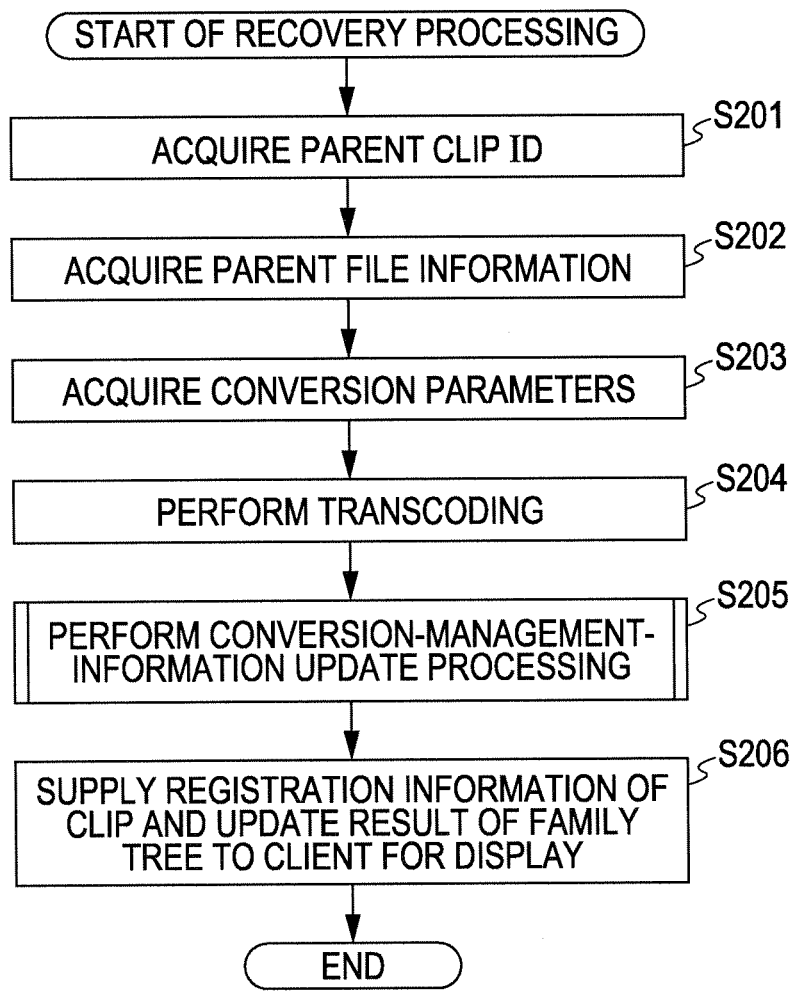
FIG. 22 is a flowchart illustrating an example of a flow of recovery processing.

An example of a flow of recovery processing as described above will now be described with reference to a flowchart shown in FIG. 22.

When the user interface section 691 obtains a recovery request from the remote client 103, the recovery processing is started. Upon start of the recovery processing, in step S201, the parent-clip-ID acquirer 692 acquires the clip ID (the parent-clip ID) of a parent clip of a clip to be recovered.

In step S202, by using the parent-clip ID, the parent-file-information acquirer 693 acquires the file information (the parent file information) of the parent clip.

In step S203, the conversion-parameter acquirer 694 acquires, from the clip information of the clip to be recovered, the conversion parameters used in transcoding performed when the clip whose file is to be recovered was created.

In step S204, the transcoding section 695 uses the parent file information and the conversion parameters to perform parent-clip transcoding for recovering the file of the specified clip.

In step S205, the conversion-management-information updater 696 performs conversion-management-information update processing to reflect, in the conversion management information, the transcoding performed in step S204 (i.e., the transcoding for recovering the file). Since the conversion-management-information update processing is similar to the conversion processing in steps S123 to S126 described above with reference to the flowchart shown in FIG. 13, a detailed description thereof is not given hereinafter.

In step S206, the display controller 697 supplies the updated clip information and family-tree information to the remote client 103, so as to display the clip information and the family-tree information.

Upon completion of the processing in step S206, the recovery processing ends.

When the clip information and the family-tree information are supplied as a result of recovery processing as described above, the remote client 103 displays the clip information and the family-tree information.

As described above, the multi-format transcoder 101 can easily recover a desired clip by using the conversion management information.

Figure 23A:
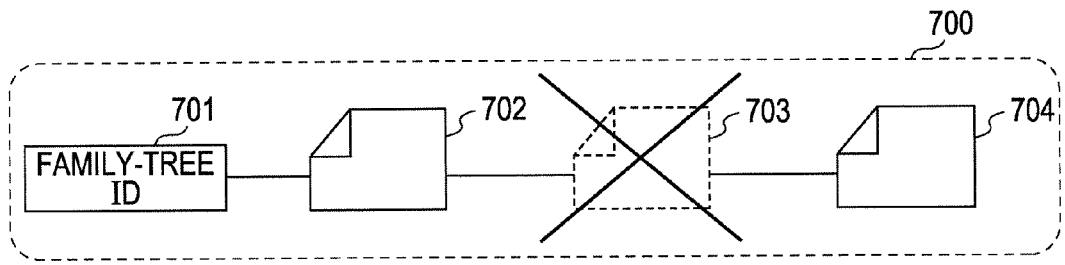
FIGS. 23A to 23C illustrate an example of how a file is recovered.

For example, it is assumed that, as shown in FIG. 23A, in a family tree 700 having family-tree ID 701 and having clips 702 to 704 as nodes, the file of the clip 703 has been deleted.

Figure 23B:
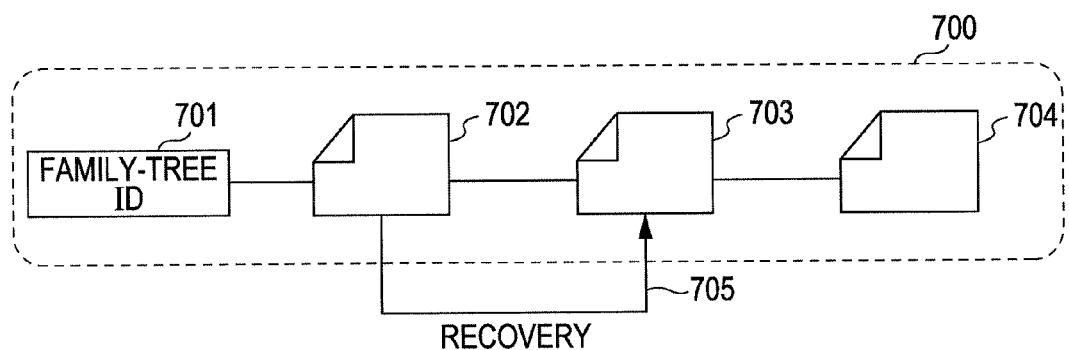

For example, when the user specifies the clip 703 in the family tree 700 displayed on the monitor and gives a request for recovering the file of the clip 703, the recovery processing is performed as described above. That is, as indicated by arrow 705 shown in FIG. 23B, the clip 702 is re-transcoded, so that the file of the clip 703 is recovered.

The recovery of the file of the clip 703, herein, refers to merely creating a new file having contents that are the same as the contents of the deleted file and does not mean recovering the deleted file itself. Strictly speaking, the data and time of creation, the file path, and so on are different from those of the deleted file.

Figure 23C:
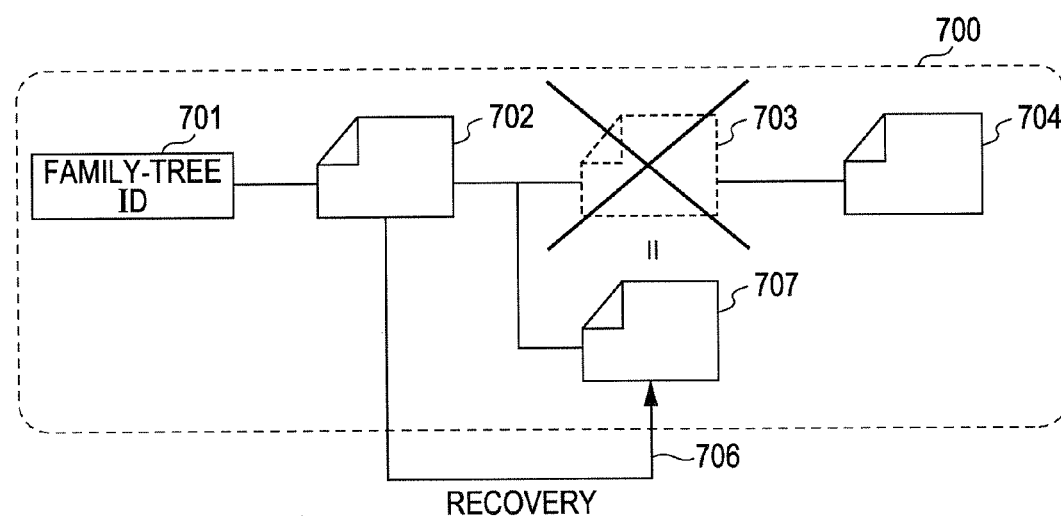

That is, as shown in FIG. 23C, in the family tree 700, the file recovery may be performed so as to create a new clip 707, as indicated by arrow 706.

As described above, the user can easily recover a desired clip by using the family tree and the clip information.

[Recovery over Multiple Generations]

A case in which files of clips in two or more consecutive generations have been deleted is also presumable. In other words, a file of a parent clip of a clip whose file is to be recovered may be absent.

For example, the multi-format transcoder 101 has, as the function for using the conversion management information, a capability to recover a clip whose file has been deleted, by using a file of an ancestor clip going back multiple generations. In this case, the multi-format transcoder 101 identifies an ancestor clip that can be used for recovery, by using the conversion management information, and reproduces virtually entire transcoding until a desired clip is obtained from the ancestor clip, to thereby recover the file of the desired clip.

Figure 24:
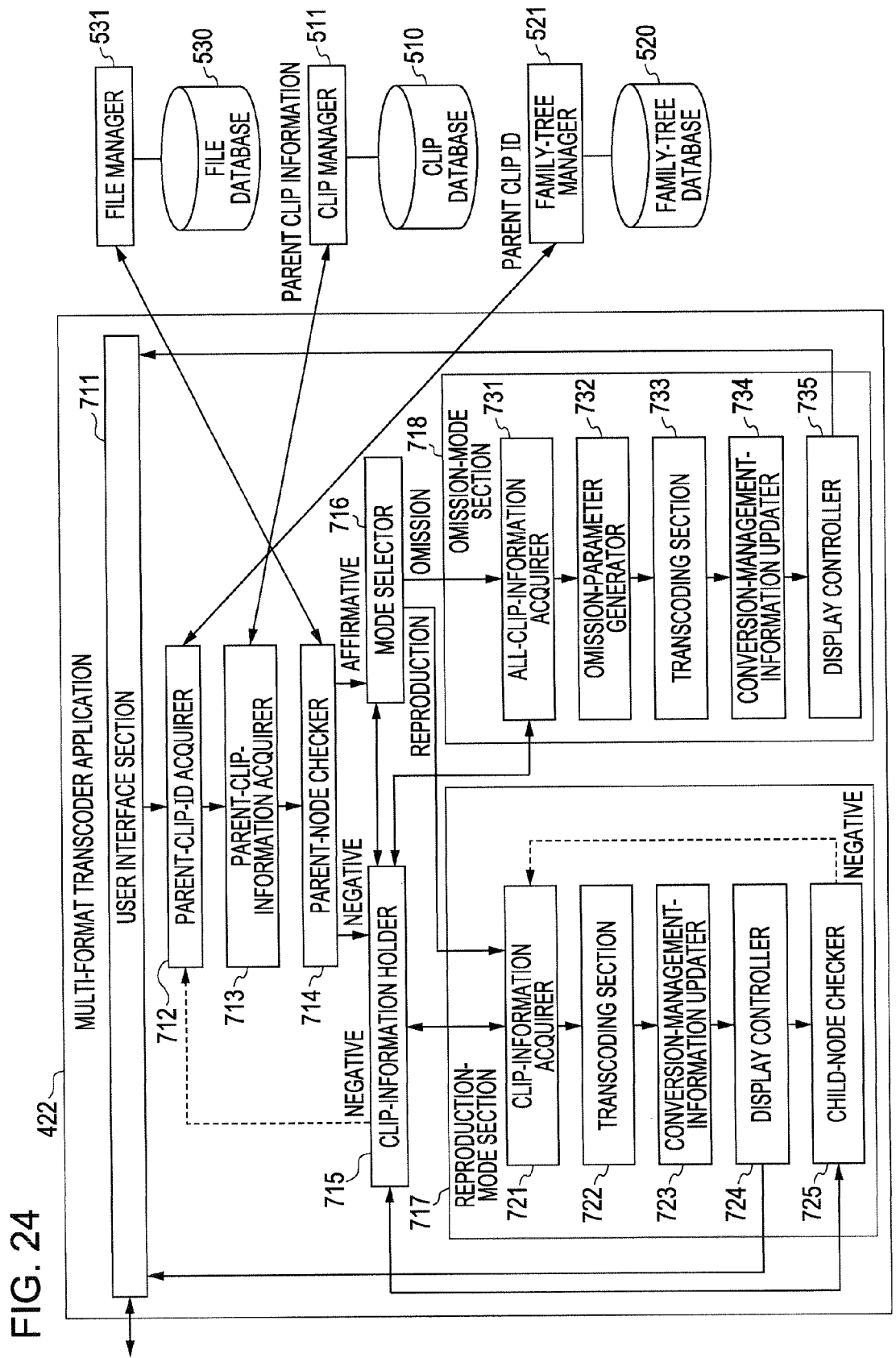
FIG. 24 is a diagram showing an example of major functional blocks involved in recovery of a clip over multiple generations.

FIG. 24 is a diagram showing an example of major functional blocks involved in such recovery of a clip over multiple generations. The functional blocks shown in FIG. 24 are realized by execution of the multi-format transcoder application 422.

As shown in FIG. 24, the multi-format transcoder 101 has, as the functional blocks involved in recovery of a file, a user interface section 711, a parent-clip-ID acquirer 712, a parent-clip-information acquirer 713, a parent-node checker 714, a clip-information holder 715, a mode selector 716, a reproduction-mode section 717, and an omission-mode section 718.

Through exchange of information with the remote client 103 via the SOAP interface 421, the user interface section 711 receives a recovery request and supplies the clip information of a clip whose file has been recovered and family-tree information in which the processing of the recovery is reflected.

The recovery request of a clip includes information (e.g., a clip ID) specifying the clip to be recovered. Through access to the family-tree manager 521, the parent-clip-ID acquirer 712 identifies a family tree to which the clip specified by the recovery request belongs and acquires, from the family-tree database 520, the clip ID (the parent-clip ID) of a parent clip of the clip to be recovered, on the basis of the family-tree information of the specified family tree. The parent-clip-ID acquirer 712 supplies the acquired parent-clip ID to the parent-clip-information acquirer 713.

The parent-clip-information acquirer 713 accesses the clip manager 511 to acquire, from the clip database 510, the clip information (the parent clip information) of the clip (the parent clip) corresponding to the parent-clip ID. Through access to the clip manager 511, the parent-clip-information acquirer 713 also acquires the clip information of the intended clip from the clip database 510. The clip-information acquirer 713 supplies the acquired clip information to the parent-node checker 714.

Through access to the file manager 531, the parent-node checker 714 checks the presence of a file of the parent clip by using the parent clip information and supplies the clip information to the clip-information holder 715 so as to cause the clip information to be held therein.

When a file of the parent file does not exist and the clip-information holder 715 holds the clip information, the parent-clip-ID acquirer 712, the parent-clip-information acquirer 713, and the parent-node checker 714 repeatedly perform the above-described processing on the parent clip as a node to be processed.

The processing is repeated as described above until a parent clip whose file exists is confirmed. When the presence of a file of a parent clip is confirmed as a result of the processing repeated as described above, the parent-node checker 714 notifies the mode selector 716 that a file of a parent clip exists.

On the basis of the parent clip information held in the clip-information holder 715, the mode selector 716 selects one of a reproduction mode and an omission mode as a processing mode for transcoding for recovering the file.

The reproduction mode is a mode in which an entire method of actually performed transcoding is reproduced. That is, in the case of the reproduction mode, transcoding for recovering a file of a child clip from an ancestor clip whose file exists is repeated until a file of the intended clip is recovered.

Thus, in the case of the reproduction mode, transcoding performed once is merely redone by the same method, so that a file of an intended clip can be precisely reproduced. As an ancestor clip at which the transcoding is started is more away from the generation of an intended clip, the number of times the transcoding for file recovery is performed increases. Thus, the load of the recovery processing may increase.

The omission mode is a mode in which all conversion parameters used in multiple rounds of the transcoding that are to be performed to recover a file of an intended clip are reconfigured, conversion parameters (omission parameters) with which the file of the intended clip can be recovered by performing the transcoding once from an ancestor clip at which the transcoding is started are created, and the file of the intended clip is recovered by performing the transcoding once using the omission parameters.

Thus, in the case of the omission mode, even when an ancestor clip at which the transcoding is started is away from the generation of an intended clip, the recovery thereof can be accomplished by performing the transcoding only once and thus the load of the recovery processing does not increase. However, for example, when special processing, such as image editing or superimposition (the so-called "burn-in") of video and time code, has been performed, there is a case in which a file is not reproducible by performing the transcoding once. This omission mode is not usable to deal with such a case.

The mode selector 716 selects a more appropriate one of the reproduction mode and the omission mode, depending on conditions, such as the details of the transcoding and the current status. When the reproduction mode is selected, the reproduction-mode section 717 is notified that the reproduction mode is selected.

The reproduction-mode section 717 performs transcoding in the reproduction mode to recover a file of an intended clip.

The reproduction-mode section 717 has a clip-information acquirer 721, a transcoding section 722, a conversion-management-information updater 723, a display controller 724, and a child-node checker 725.

The reproduction-mode section 717 initially performs processing on a first ancestor clip whose file exists, in an ascending order from an intended clip in the family tree.

The clip-information acquirer 721 acquires, from the clip-information holder 715, the clip information of child clips of a clip to be processed. This child clips are, in the family tree, clips (used for recovering a file of an intended clip) of nodes (including the node of the intended clip) that exist on a path from the clip to be processed to the intended clip.

In the family tree, it is not necessary to recover nodes that do not exist on the path from the clip to be processed to the intended clip, that is, clips that are not used to recover the file of the intended clip. Thus, a description below is given based on the assumption that such clips do not exist (i.e., such nodes are not processed).

By using the clip information acquired by the clip-information acquirer 721, the transcoding section 722 transcodes the clip to be processed, to thereby recover the file of the child clip.

Upon recovery of the file of the child clip, the conversion-management-information updater 723 performs addition of the clip information and update of the family-tree information to reflect the result of the transcoding. The conversion-management-information updater 723 has a configuration that is basically the same as the configuration of the conversion-management-information updater 634 shown in FIG. 12, and performs processing that is similar thereto.

The display controller 724 supplies the clip information and family-tree information, supplied from the conversion-management-information updater 723, to the remote client 103 via the user interface section 711 so as to display the clip information and the family-tree information. That is, a result of the transcoding performed once is reflected in the display.

The child-node checker 725 determines whether or not the clip information of a child clip of a child clip of the clip to be processed (i.e., the clip information of a grandchild clip of the clip to be processed) exists in the clip-information holder 715.

When a grandchild clip exists, that is, when the file of the intended clip has not been recovered yet and transcoding is to be further repeated, the reproduction-mode section 717 changes the processing target to a child node (a child clip) and causes the individual sections to re-execute the above-described processing.

The individual sections of the reproduction-mode section 717 repeatedly execute the above-described processing until the file of the intended clip is recovered. Upon recovery of the file of the intended clip, the individual sections of the reproduction-mode section 717 ends the processing.

When the omission mode is selected, the mode selector 716 notifies the omission-mode section 718 that the omission mode is selected.

The omission-mode section 718 performs transcoding in the omission mode to recover a file of an intended clip.

The omission-mode section 718 has an all-clip-information acquirer 731, an omission-parameter generator 732, a transcoding section 733, a conversion-management-information updater 734, and a display controller 735.

The all-clip-information acquirer 731 acquires all of clip information held in the clip-information holder 715 and supplies the clip information to the omission-parameter generator 732.

On the basis of the supplied clip information, the omission-parameter generator 732 generates omission parameters with which an intended clip file is recovered by performing transcoding once from a clip to be processed. The omission-parameter generator 732 supplies the generated omission parameters to the transcoding section 733.

Using the omission parameters, the transcoding section 733 transcodes the clip to be processed, to thereby recover the file of the intended clip.

Upon recovery of the file of the intended clip, the conversion-management-information updater 734 performs addition of the clip information and update of the family-tree information to reflect the result of the transcoding. The conversion-management-information updater 734 has a configuration that is basically the same as the configuration of the conversion-management-information updater 634 shown in FIG. 12, and performs processing that is similar thereto.

The display controller 735 supplies the clip information and family-tree information, supplied from the conversion-management-information updater 734, to the remote client 103 via the user interface section 711 so as to display the clip information and the family-tree information. That is, a result of transcoding for recovering the file of the intended clip is reflected in the display. When display control is finished, the processing ends.

Thus, by using the conversion management information, the multi-format transcoder 101 can easily and precisely recover a file of a specified clip.

Figure 25:
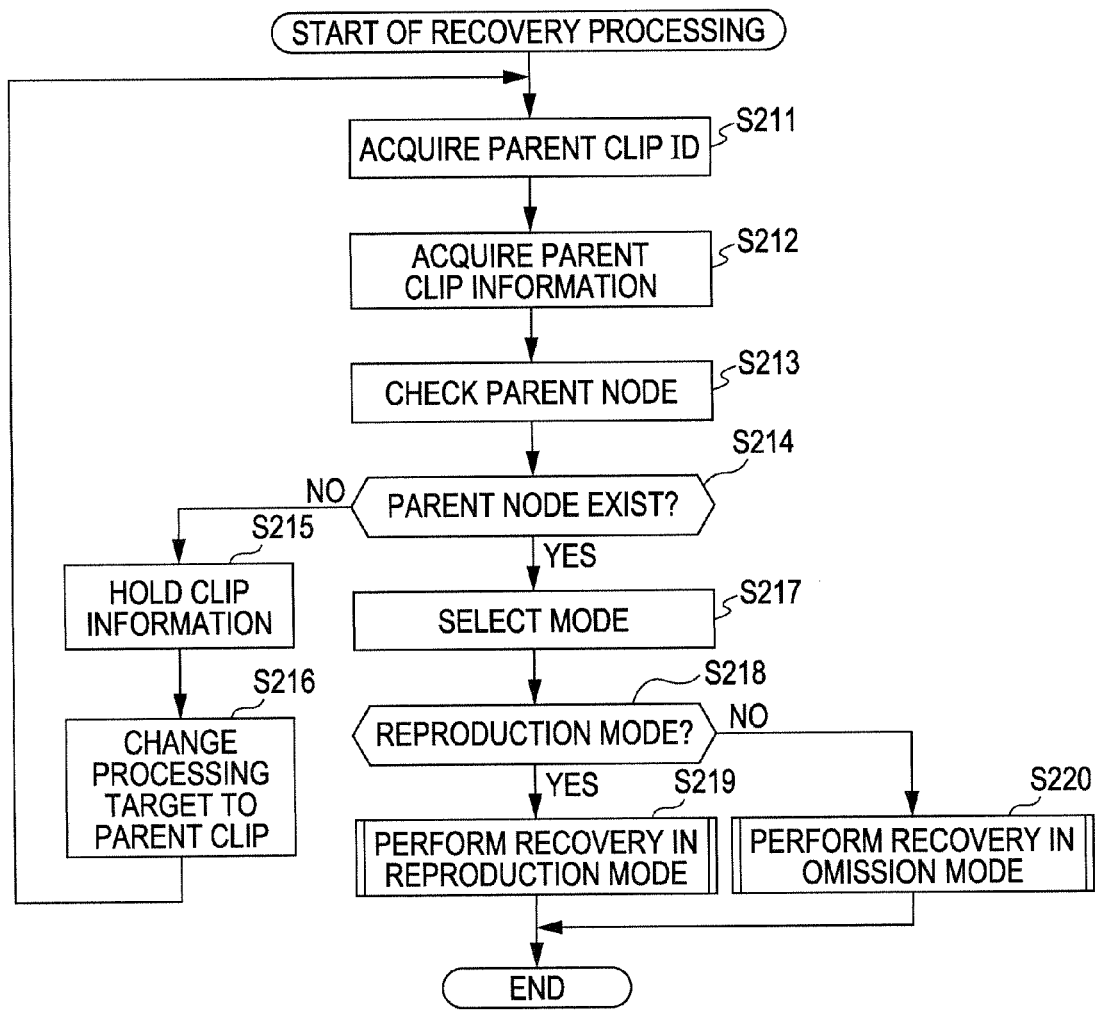
FIG. 25 is a flowchart illustrating another example of a flow of the recovery processing.

An example of a flow of recovery processing as described above will now be described with reference to a flowchart shown in FIG. 25.

When the user interface section 711 obtains a recovery request from the remote client 103, the recovery processing is started. Upon start of the recovery processing, in step S211, the parent-clip-ID acquirer 712 acquires the clip ID (the parent-clip ID) of a parent clip of the intended clip whose file is to be recovered.

In step S212, by using the parent-clip ID, the parent-file-information acquirer 693 acquires the clip information (the parent clip information) of the parent clip and the clip information of the intended clip.

In step S213, by using the parent clip information, the parent-node checker 714 checks whether or not a file of the parent clip exists (i.e., checks a parent node). In step S214, on the basis of the result of the checking, the parent-node checker 714 determines whether or not a file of the parent clip exists (i.e., whether or not a parent node exists).

When it is determined that a file of the parent clip does not exist, the process proceeds to step S215. In step S215, the clip-information holder 715 holds the clip information obtained in step S212.

In step S216, the reproduction-mode section 717 changes the processing target to a parent clip (a parent node) of the current clip. Upon completion of the processing in step S216, the process returns to step S211 and the subsequent processing is performed again.

When it is determined in step S214 that the file of the parent clip exists, the process proceeds to step S217.

In step S217, the mode selector 716 selects one of the reproduction mode and the omission mode. In step S218, the mode selector 716 determines whether or not the reproduction mode is selected. When it is determined that the reproduction mode is selected, the process proceeds to step S219.

In step S219, the reproduction-mode section 717 performs file recovery processing in the reproduction mode. When the file of the intended clip is recovered, the recovery processing ends.

When it is determined in step S218 that the omission mode is selected, the process proceeds to step S220. In step S220, the omission-mode section 718 performs file recovery processing in the omission mode. When the file of the intended clip is recovered, the recovery processing ends.

Figure 26:
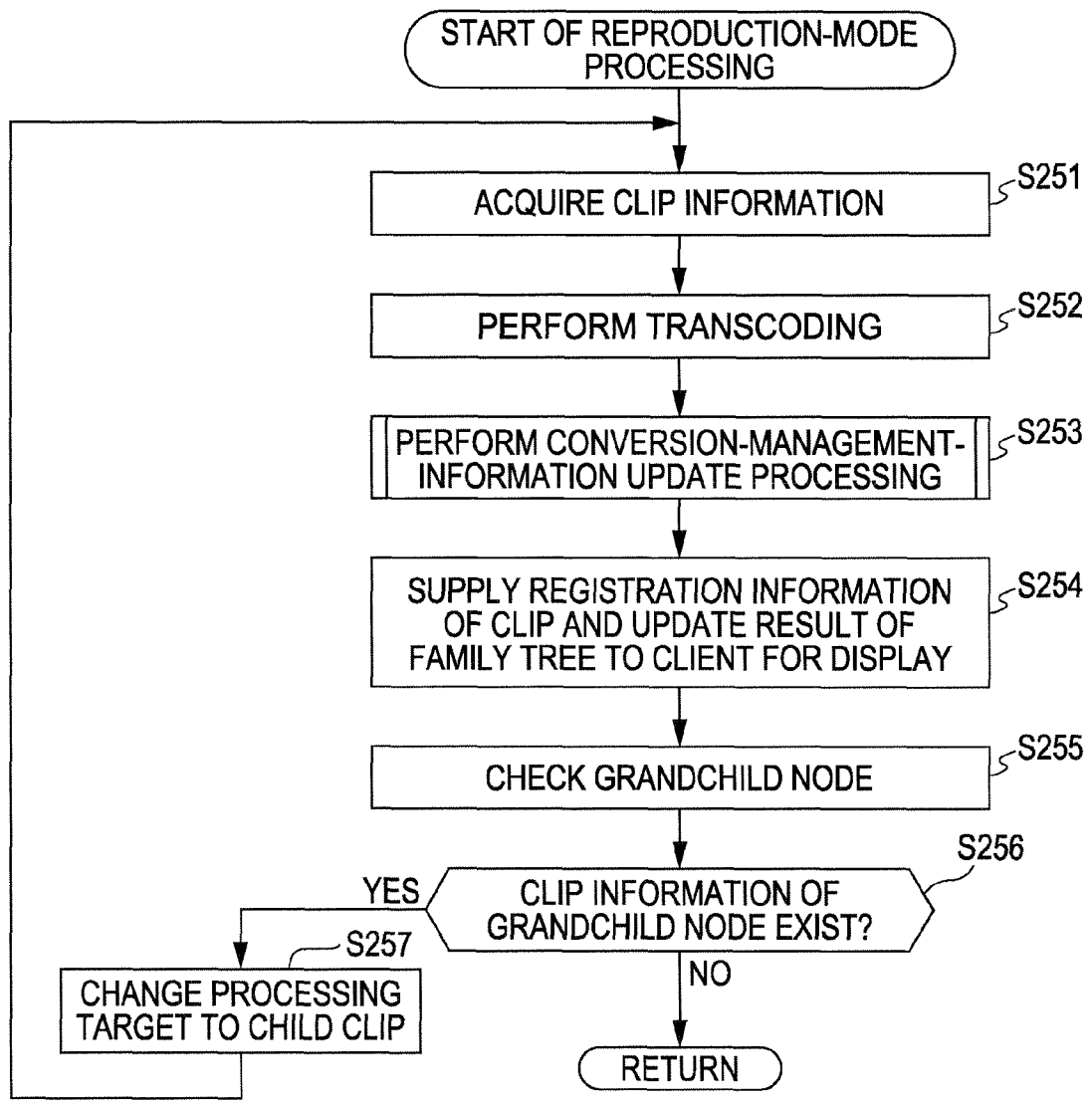
FIG. 26 is a flowchart illustrating an example of a flow of reproduction-mode processing.

Next, an example of a flow of the reproduction mode processing executed in step S219 in FIG. 25 will be described with reference to a flowchart shown in FIG. 26.

Upon start of the reproduction-mode processing, in step S251, the clip-information acquirer 721 acquires the clip information of a child clip of the clip to be processed. In step S252, the transcoding section 722 transcodes the clip to be processed, to thereby recover a file of the child clip.

In step S253, the conversion-management-information updater 723 performs conversion-management-information update processing to reflect, in the clip information and the family-tree information, the transcoding performed in step S252. Since the conversion-management-information update processing is similar to the conversion processing in steps S123 to S126 described above with reference to the flowchart shown in FIG. 13, a detailed description thereof is not given hereinafter.

In step S254, the display controller 724 supplies the updated clip information and the family-tree information to the remote client 103, so as to display the clip information and the family-tree information.

In step S255, the child-node checker 725 checks, with the clip-information holder 715, whether or not the clip information of a child clip of the clip whose file was recovered (i.e., the clip information of a grandchild node) exists. In step S256, on the basis of the result of the checking, the child-node checker 725 determines whether or not the clip information of a child clip of the clip whose file was recovered (i.e., the clip information of a grandchild node) is held in the clip-information holder 715. When it is determined that the clip information of a grandchild node exists, the process proceeds to step S257.

In step S257, the reproduction-mode section 717 changes the processing target to the child clip of the current clip. Upon completion of the processing in step S257, the process returns to step S251 and the subsequent processing is performed again.

When it is determined in step S256 that the clip information of a grandchild node does not exist, the reproduction-mode processing ends. The process then returns to step S219 in FIG. 25, and the recovery processing ends.

Figure 27:
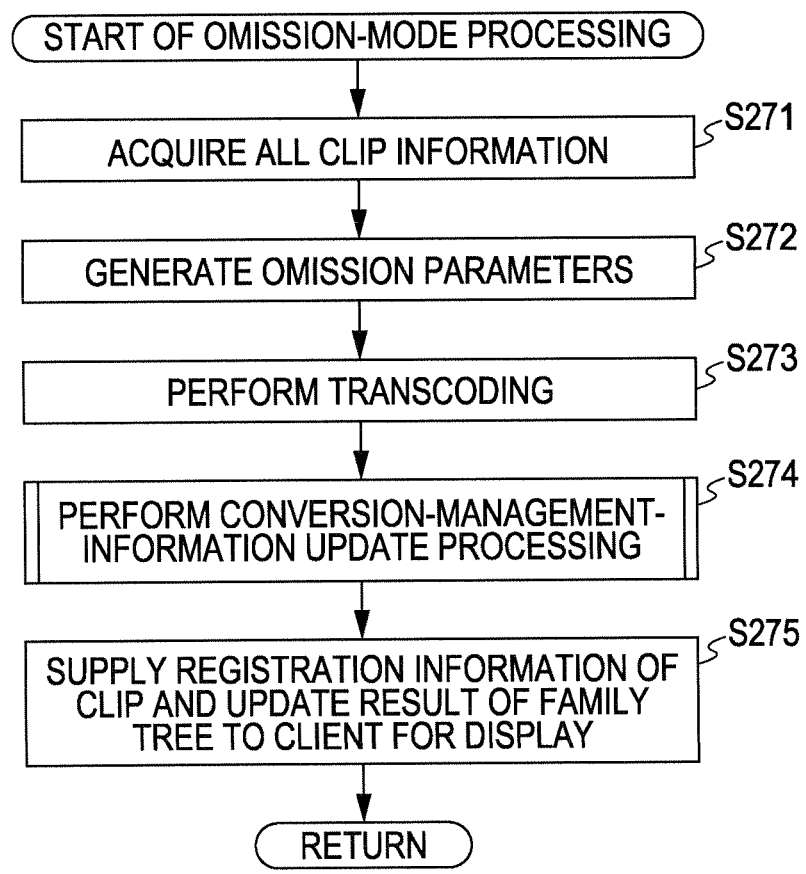
FIG. 27 is a flowchart illustrating an example of a flow of omission-mode processing.

Next, an example of a flow of the omission mode processing executed in step S220 in FIG. 25 will be described with reference to a flowchart shown in FIG. 27.

Upon start of the omission-mode processing, in step S271, the all-clip-information acquirer 731 acquires all of clip information held in the clip-information holder 715. In step S272, the omission-parameter generator 732 generates omission parameters from all the clip information obtained in step S271.

In step S273, by using the omission parameters generated in step S272, the transcoding section 733 performs transcoding to recover a file of the intended clip.

In step S274, the conversion-management-information updater 734 performs conversion-management-information update processing to reflect, in the clip information and the family-tree information, the transcoding performed in step S273. Since the conversion-management-information update processing is similar to the conversion processing in steps S123 to S126 described above with reference to the flowchart shown in FIG. 13, a detailed description thereof is not given hereinafter.

In step S275, the display controller 735 supplies the updated clip information and the family-tree information to the remote client 103, so as to display the clip information and the family-tree information.

Upon completion of the processing in step S275, the omission-mode processing ends. The process then returns to step S220 in FIG. 25, and the recovery processing ends.

By executing the processing in the manner described above, the multi-format transcoder 101 can also easily accomplish the recovery processing that involves transcoding over multiple generations, through the use of the conversion management information.

Figure 28:
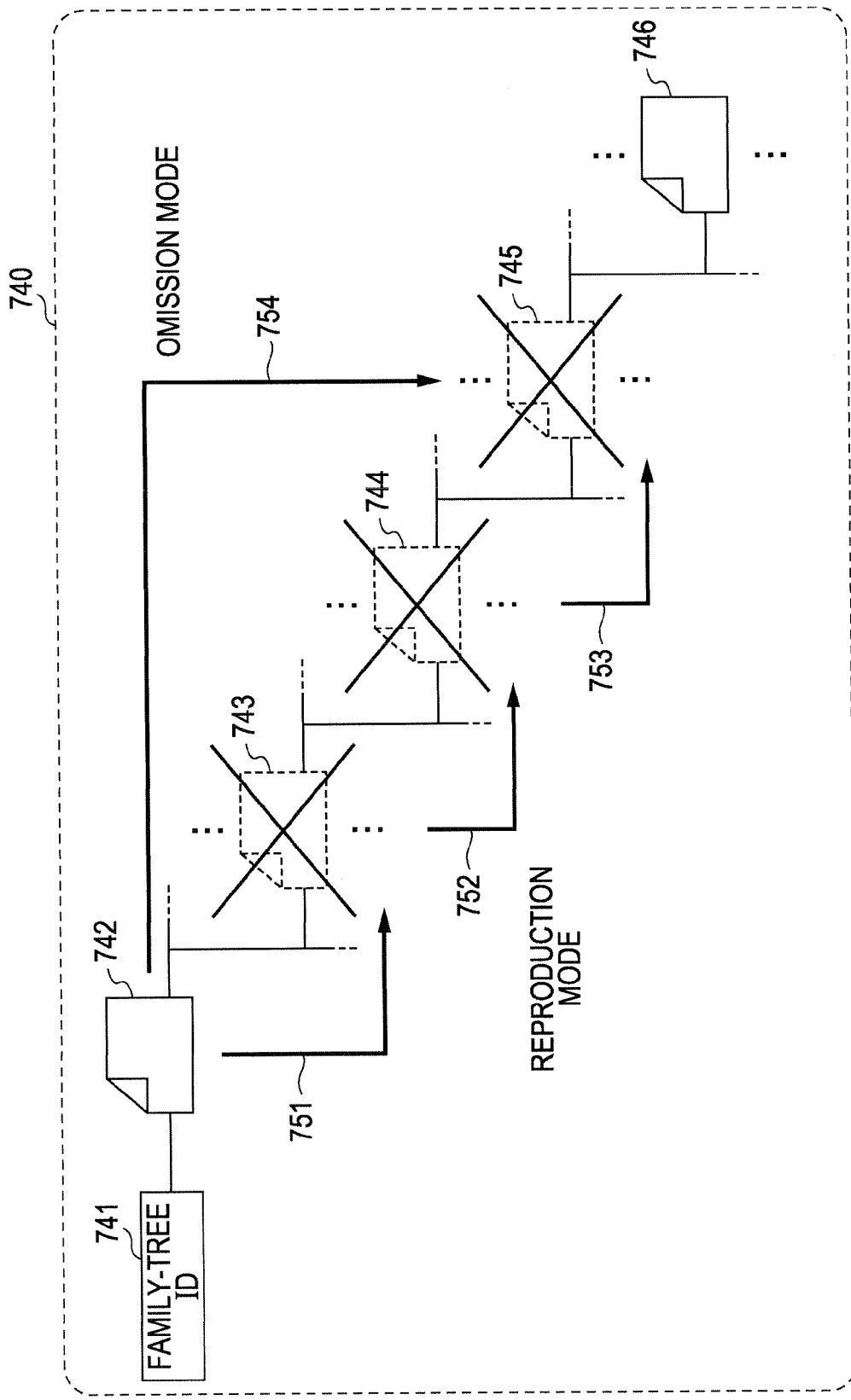
FIG. 28 is a diagram illustrating a difference between the modes.

For example, it is assumed that, as shown in FIG. 28, files of clips 743 to 745 of clips 742 to 746 in a family tree 740 with family-tree ID 741 have been deleted and thus do not exist. When the file of the clip 745 is to be recovered, the multi-format transcoder 101 identifies the clip 742 whose file exists, by using the conversion management information, and transcodes the clip 742 to recover the file of the clip 745.

In the case of the reproduction mode, the multi-format transcoder 101 recovers the file of the clip 743 from the clip 742, as indicated by arrow 751, recovers the file of the clip 744 from the clip 743, as indicated by arrow 752, and recovers the file of the clip 745 from the clip 744, as indicated by arrow 753.

In the case of the omission mode, the multi-format transcoder 101 generates omission parameters and recovers the file of the clip 745 from the clip 742, as indicated by arrow 754.

That is, in the case of the reproduction mode, the multi-format transcoder 101 can precisely recover a file of an intended clip, no matter how the transcoding has been performed, and in the case of the omission mode, the multi-format transcoder 101 can reduce the load of recovery of a file of an intended clip.

Thus, since the multi-format transcoder 101 has the two modes, it is possible to appropriately handle various conversion hierarchies.

The multi-format transcoder 101 may be configured so as to have only one of the reproduction mode and the omission mode.

[Deletion of Clip]

Since the multi-format transcoder 101 can easily recover a file, as appropriate, a file that satisfies a predetermined condition, for example, a file that is used less frequently, may be deleted.

For example, the multi-format transcoder 101 has, as the function for using the conversion management information, a capability to retrieve and delete a file that satisfies a predetermined condition.

Figure 29:
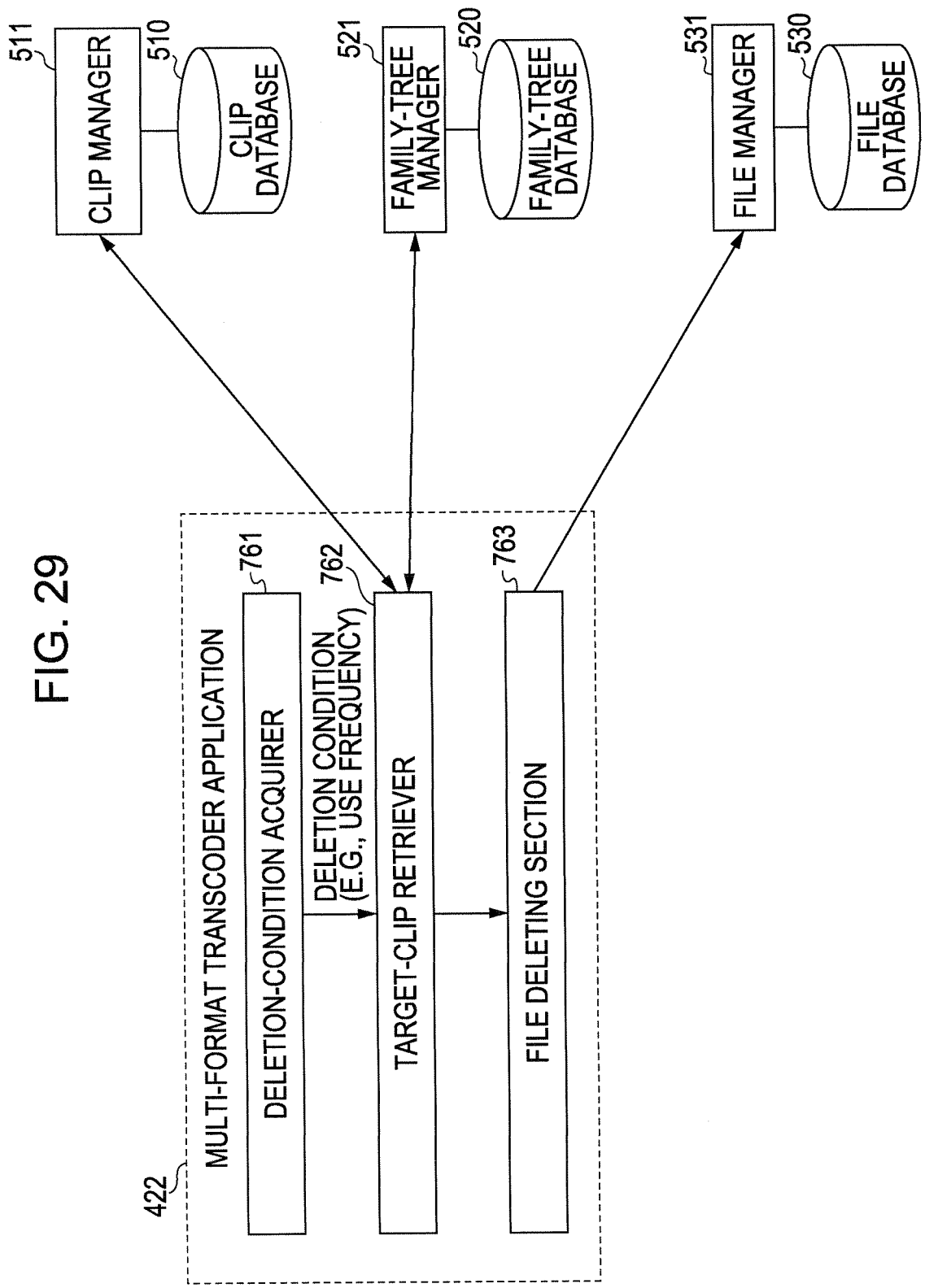
FIG. 29 is a diagram showing an example of major functional blocks involved in deletion of a clip.

FIG. 29 is a diagram showing an example of major functional blocks involved in deletion of such a file. The functional blocks shown in FIG. 29 are realized by execution of the multi-format transcoder application 422.

As shown in FIG. 29, the multi-format transcoder 101 has, as the functional blocks involved in deletion of a file, a deletion-condition acquirer 761, a target-clip retriever 762, and a file deleting section 763.

The deletion-condition acquirer 761 acquires a condition for file deletion. For example, the condition for the deletion may be set by the user, may be pre-stored, or may be determined based on other information, such as the free space of the media server 401.

Through access to the clip manager 511 and the family-tree manager 521, the target-clip retriever 762 retrieves a clip that satisfies the deletion condition supplied from the deletion-condition acquirer 761, on the basis of the clip information registered in the clip database 510 and a family tree managed by the family-tree database 520.

The file deleting section 763 accesses the file manager 531 to delete, from the file database 530, a file of a clip that is determined by the target-clip retriever 762 to satisfy the deletion condition.

With this arrangement, the multi-format transcoder 101 can delete a file and can reduce the total amount of data of stored files (i.e., the capacity of the file database 530).

Figure 30:
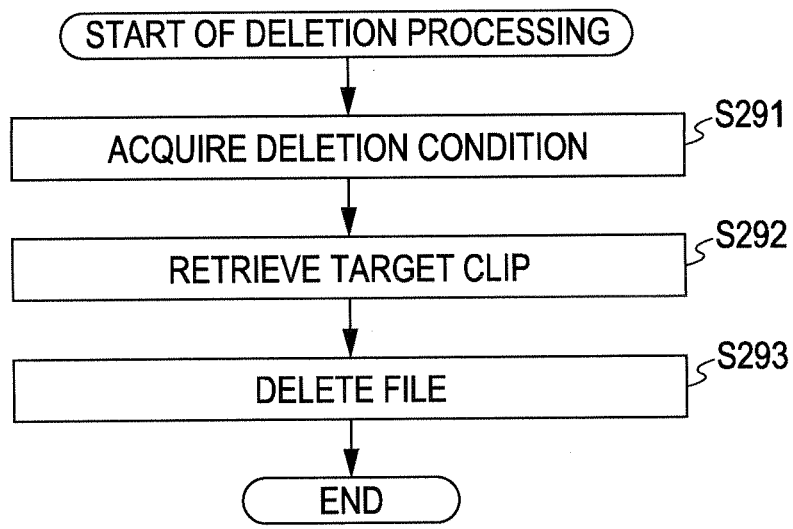
FIG. 30 is a flowchart illustrating an example of a flow of deletion processing.

An example of a flow of deletion processing as described above will now be described with reference to a flowchart shown in FIG. 30.

The deletion processing may be constantly executed in the background. Alternatively, when a predetermined time is reached or a predetermined event occurs, the deletion processing may be executed on a regular or irregular basis.

Upon start of the deletion processing, the deletion-condition acquirer 761 acquires a deletion condition in step S291. After acquiring the deletion condition, in step S292, the target-clip retriever 762 retrieves a clip (a target clip) that satisfies the deletion condition. When the target clip is retrieved, the file deleting section 763 deletes a file of the target clip in step S293. Upon deletion of the file of the target clip, the deletion processing ends.

As described above, by using the conversion management information, the multi-format transcoder 101 can retrieve a clip that satisfies a predetermined deletion condition, by using the conversion management information, and can delete a file of a clip. Consequently, it is possible to reduce the capacity used for file storage and can reduce the cost.

[Management of Multiple Tasks]

The multi-format transcoder 101 processes processing, such as transcoding, as tasks. The multi-format transcoder 101 can manage the execution of the tasks and can simultaneously execute multiple tasks in parallel.

Figure 31:
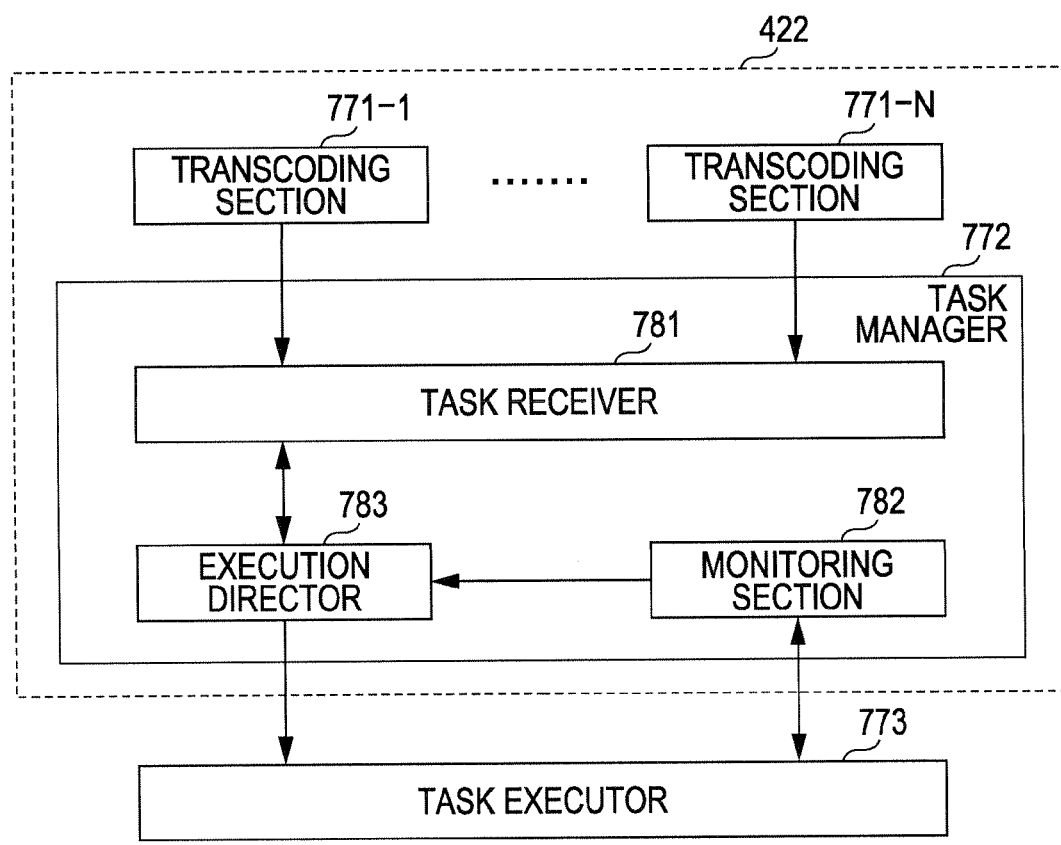
FIG. 31 is a diagram showing an example of major functional blocks involved in management of execution of multiple tasks.

FIG. 31 is a diagram showing an example of major functional blocks involved in management of execution of multiple tasks. The functional blocks shown in FIG. 31 are realized by execution of the multi-format transcoder application 422.

As shown in FIG. 31, the multi-format transcoder 101 has, as the functional blocks involved in management of execution of multiple tasks, transcoding sections 771-1 to 771-N, a task manager 772, and a task executor 773.

The transcoding sections 771-1 to 771-N are N transcoding sections that are independent from each other. Each of the transcoding sections 771-1 to 771-N serves as a processor that is basically the same as, for example, the transcoding section 633 shown in FIG. 12. Each of the transcoding sections 771-1 to 771-N issues transcoding processing as a task. The transcoding sections 771-1 to 771-N will simply be referred as "transcoding sections 771", unless they should be distinguished from each other in the description.

The task manager 772 manages execution of tasks supplied from the transcoding sections 771. The task manager 772 has a task receiver 781, a monitoring section 782, and an execution director 783.

The task receiver 781 receives the tasks supplied from the transcoding section 771. The monitoring section 782 monitors the task execution state of the task executor 773 that executes the tasks. When the task executor 773 can execute a new task, the monitoring section 782 notifies the execution director 783 that a new task can be executed. When the monitoring section 782 permits execution of the new task, the execution director 783 supplies the task, received by the task receiver 781, to the task executor 773 for execution.

The task executor 773 corresponds to, for example, the accelerator 412 shown in FIG. 6. The task executor 773 can simultaneously execute multiple tasks in parallel. The task executor 773 executes the supplied tasks in accordance with an instruction from the execution director 783.

Figure 32:
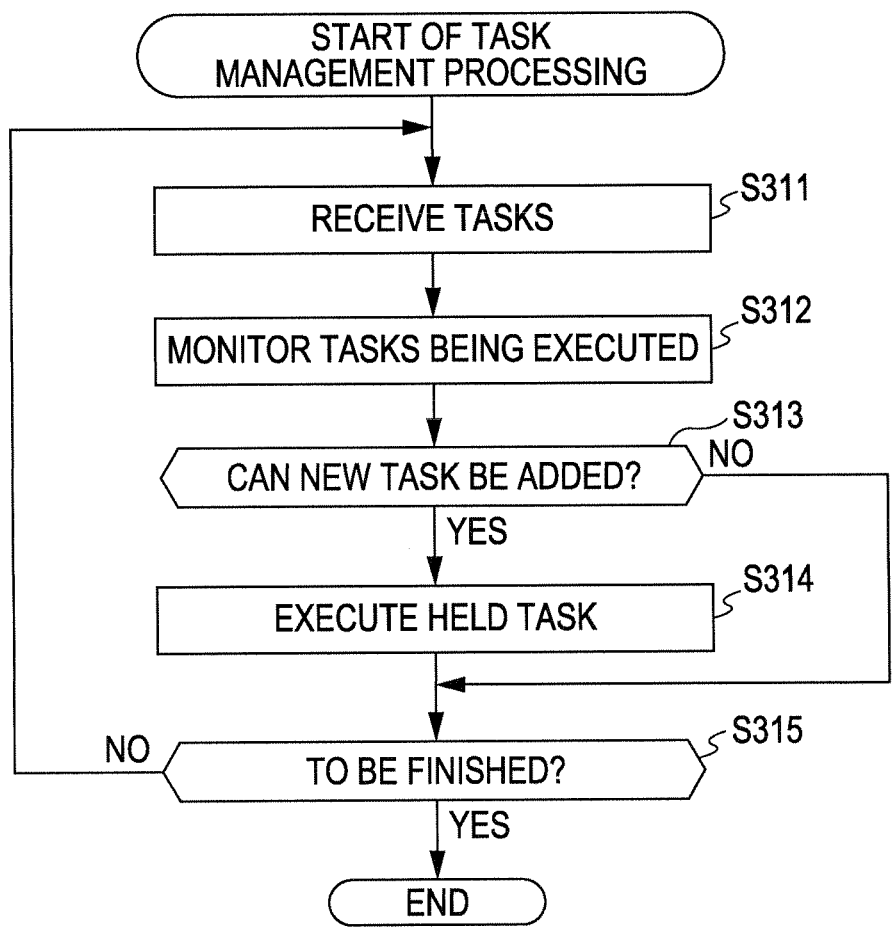
FIG. 32 is a flowchart illustrating an example of a flow of task management processing.

An example of a flow of task management processing for managing task execution as described above will now be described with reference to a flowchart shown in FIG. 32.

Upon start of the task management processing, the task receiver 781 receives tasks in step S311. In step S312, the monitoring section 782 monitors the tasks being executed by the task executor 773. In step S313, the monitoring section 782 determines whether or not a new task can be added. When it is determined that a new task can be added, the process proceeds to step S314.

In step S314, the execution director 783 supplies a held task to the task executor 773 for execution. Upon completion of the processing in step S314, the process proceeds to step S315. When it is determined in step S313 that no task can be added, the process proceeds to step S315.

In step S315, the task manager 772 determines whether or not the task management processing is to be finished. When it is determined that the task management processing is not to be finished, the process returns to step S311 and the subsequent processing is performed again. When it is determined that the task management processing is to be finished, the task management processing ends.

Since the multi-format transcoder 101 manages the task execution in the manner described above, it is possible to simultaneously execute multiple tasks in parallel.

Figure 33:
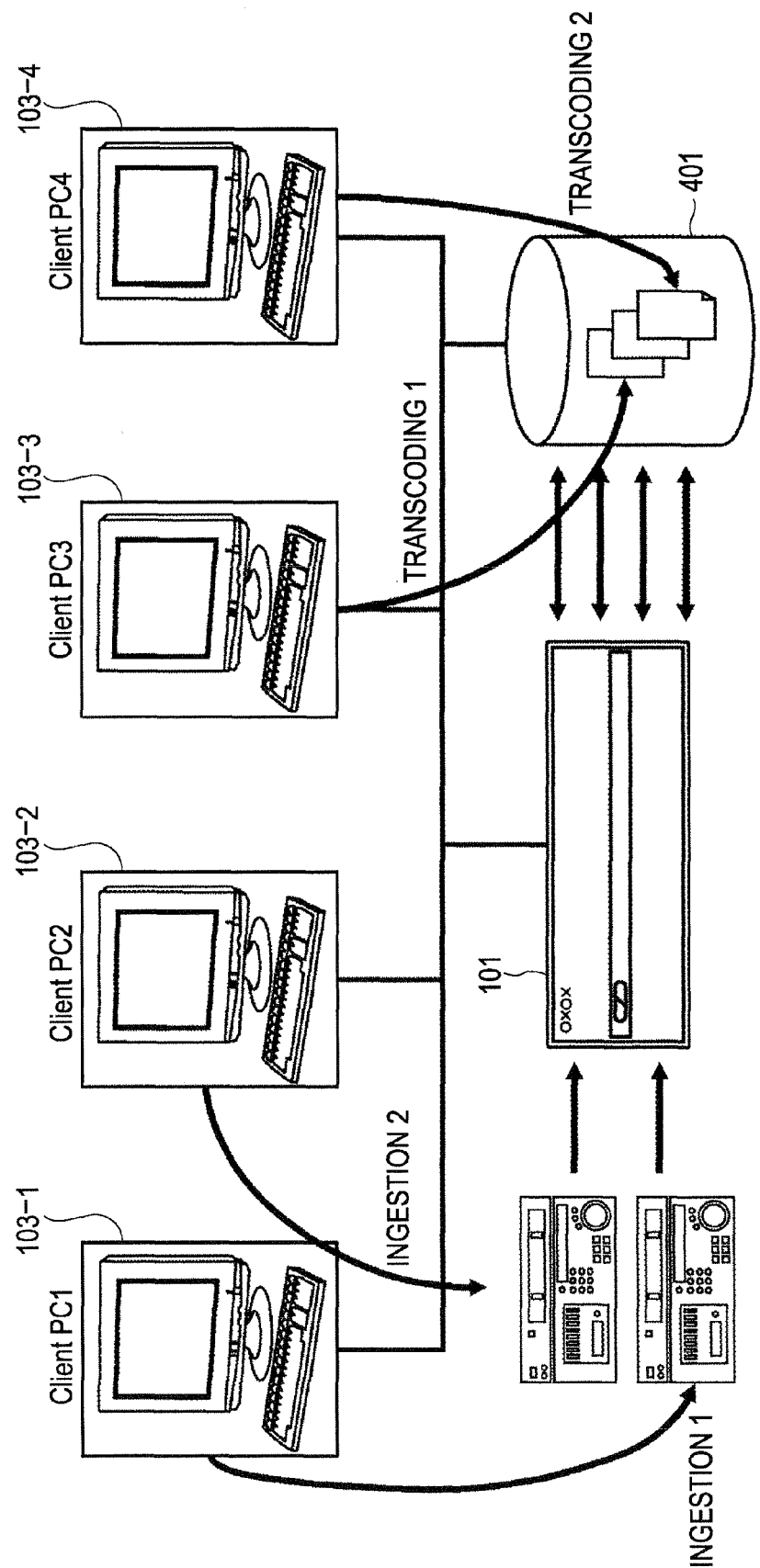
FIG. 33 illustrates how multiple tasks are managed.

With this arrangement, for example, as shown in FIG. 33, it is possible to receive requests from multiple remote clients 103 in parallel and it is possible to appropriately schedule various types of processing, such as an ingest processing and transcoding, in parallel. This arrangement allows the converter system 100 to efficiently execute processing.

Figure 34:
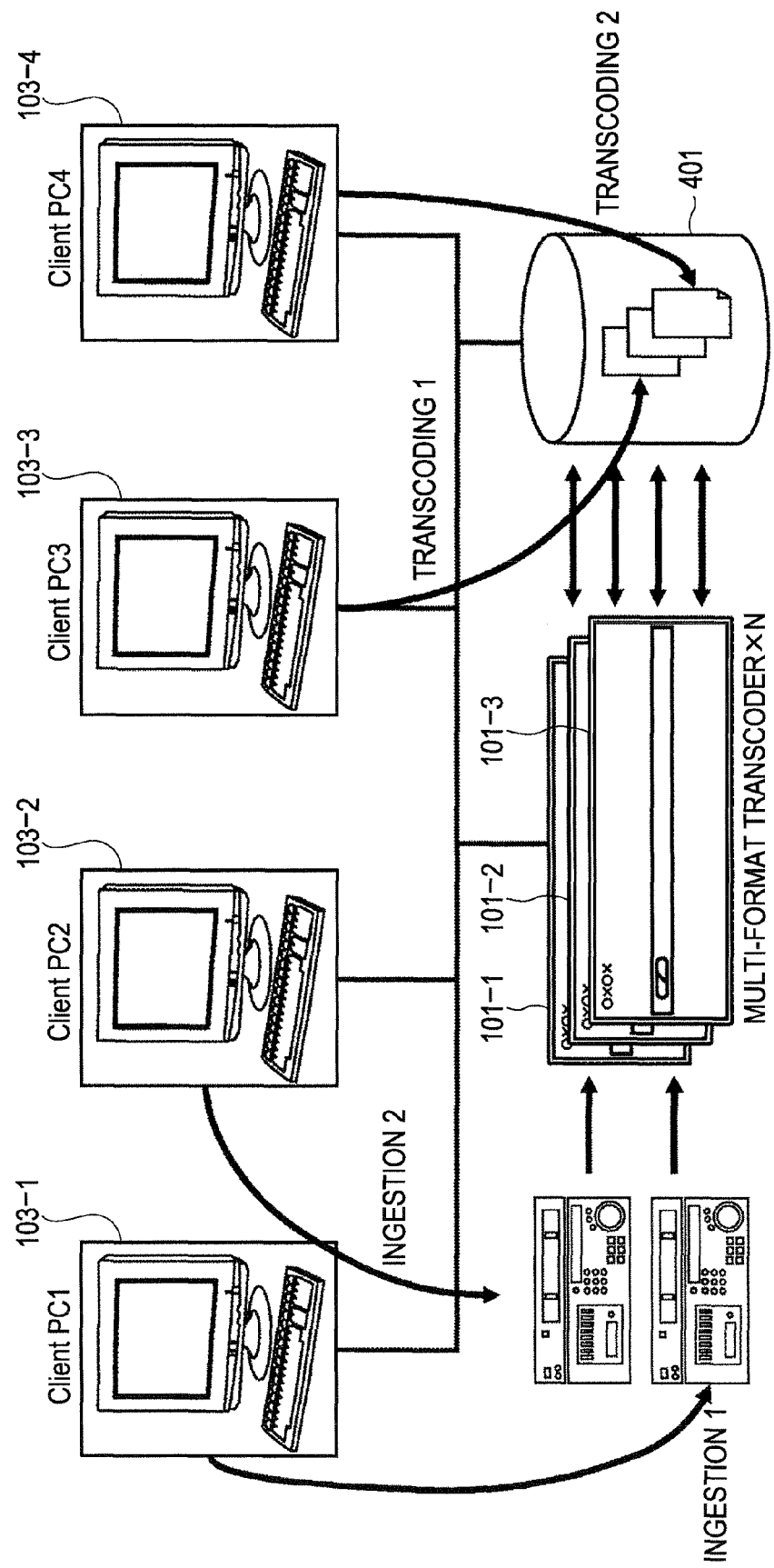
FIG. 34 illustrates how multiple tasks are executed in parallel.

The converter system 100 may have any configuration. For example, as shown in FIG. 34, the converter system 100 may be configured so that N multi-format transcoders 101 operate in cooperation with each other so as to make it possible to independently execute requests from multiple remote clients 103.

This arrangement makes it possible to reduce the load of each multi-format transcoder 101 and makes it possible to process more tasks at higher speed.

[Software]

The above-described series of processing can be executed by hardware or software. When the above-described series of processing is executed by software, a program included in the software is installed through a network or from a storage medium.

For example, the storage medium may be not only the removable medium 221 or 321 (on which the program is recorded) that is distributed to a user to supply the program, independently from the main units of the devices, as shown in FIGS. 4 and 5, but also the ROM 202 or 302 in which the program is recorded or the hard disk included in the storage unit 213 or 313 (on which the program is recorded) that is distributed to a user in a state in which it is preinstalled in the main unit of the device. Examples of the removable medium 221 or 321 includes a magnetic disk (including a flexible disk), an optical disk (such as a CD-ROM [Compact Disc-Read Only Memory] or a DVD [Digital Versatile Disc]), a magneto-optical disk (including an MD [Mini Disc]), and a semiconductor memory.

The program executed by the computer may be a program that time-sequentially performs processing according to the sequence described hereinabove, may be a program that performs processing in parallel, or may be a program that performs processing at an arbitrary timing, for example, at the time when the program is called.

Herein, the steps describing the program recorded on the storage medium not only include processing that is time-sequentially performed according to the sequence described above, but also include processing that is concurrently or individually executed without necessarily being time-sequentially processed.

The term "system" as used herein refers to an entirety constituted by multiple devices.

The element described above as a single device (or a single processor) may also be divided to configure multiple devices (or processors). Conversely, the elements described above as multiple devices (or processors) may be integrated together to configure a single device (or a single processor). Needless to say, an element other than those described above may also be added to the configuration of the above-described individual devices (or processors). Moreover, when the configuration and the operation of the entire system are substantially the same, part of the configuration of one device (or processor) may be incorporated into the configuration of another device (or processor).

The present application contains subject matter related to that disclosed in Japanese Priority Patent Application JP 2009-230941 filed in the Japan Patent Office on Oct. 2, 2009, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. An information processing device comprising:
controller circuitry includes
file-information acquiring means for acquiring file information that is information regarding a file to be subjected to conversion processing for converting a clip format; and
conversion-management-information generating means for generating conversion management information as a database that (a) indicates a history of the clip format conversion processing on each clip including conversion hierarchy and (b) indicates an identity of each clip created by the conversion processing performed on the clip format of each clip to which the file corresponding to the information belongs, by using the file information acquired by the file-information acquiring means, wherein presence/absence of a file can be determined from the database, and re-creation of a deleted file can be determined based upon the conversion hierarchy and clip identity, wherein the conversion-management-information generating means comprises:
clip-identification-information generating means for generating clip identification information;
family-tree-identification-information generating means for generating family-tree identification information;
clip-information generating means for generating clip information by using the file information acquired by the file-information acquiring means, the clip identification information generated by the clip-identification-information generating means, and the family-tree identification information generated by the family-tree-identification-information generating means; and family-tree-information generating means for generating family-tree information by using the clip identification information generated by the clip-identification-information generating means and the family-tree identification information generated by the family-tree-identification-information generating means.

2. The information processing device according to claim 1, wherein the conversion management information includes:
   clip information that is information regarding the clip created by the conversion processing; and
   family-tree information that indicates a hierarchy of the conversion processing, wherein in the family-tree information, the clip to which the file corresponding to the file information acquired by the file-information acquiring means belongs is an earliest ancestor.

3. The information processing device according to claim 2, wherein the clip information includes file information of the file belonging to the clip, conversion parameters that are parameters of the conversion processing by which the clip is created, clip identification information that identifies the clip, and family-tree identification information that identifies the family-tree information.

4. The information processing device according to claim 1, further comprising:
   file acquiring means for acquiring the file to be subjected to the conversion processing;
   wherein, when the file acquiring means acquires the file from a storage medium other than the information processing device, the clip-identification-information generating means generates identification information of the storage medium and the family-tree-information generating means generates family-tree information in which the storage medium is an earliest ancestor.

5. The information processing device according to claim 1, further comprising display controlling means for causing display of the clip information generated by the clip-information generating means and the family-tree information generated by the family-tree-information generating means.

6. The information processing device according to claim 1, further comprising:
   clip-information storing means for storing the clip information generated by the clip-information generating means; and
   family-tree-information storing means for storing the family-tree information generated by the family-tree-information generating means.

7. The information processing device according to claim 2, further comprising clip retrieving means for retrieving the clip that is the earliest ancestor in the family-tree information.

8. The information processing device according to claim 1, further comprising:
   conversion processing means for performing the conversion processing; and
   conversion-management-information updating means for updating the conversion management information so as to reflect a result of the conversion processing performed by the conversion processing means.

9. An information processing method comprising the steps of:
   acquiring file information that is information regarding a file to be subjected to conversion processing for converting a clip format; and
   generating conversion management information as a database that (a) indicates a history of the clip format conversion on each clip including conversion hierarchy and (b) indicates an identity of each clip created by the conversion processing performed on the clip format of each clip to which the file corresponding to the file information belongs, by using the acquired file information, wherein presence/absence of a file can be determined from the database, and re-creation of a deleted file can be determined based upon the conversion hierarchy and clip identity, wherein the generating conversion management information comprise the steps of:
   generating clip identification information;
   generating family-tree identification information;
   generating clip information by using the file information, the clip identification information and the family-tree identification information; and
   generating family-tree information by using the clip identification information and the family-tree identification information.

10. An information processing device comprising:
    controller circuitry including
      clip-identification-information acquiring means for acquiring, on it basis of conversion management information as a database that (a) indicates a history of the clip format conversion on each clip including conversion hierarchy and (b) indicates a clip identity and that indicates conversion processing for converting a clip format, clip identification information with respect to an ancestor clip of an intended clip to be generated by performing the conversion processing on the clip format of the ancestor clip, wherein presence/absence of a file can be determined from the database, and re-creation of a deleted file can be determined based upon the conversion hierarchy and clip identity, wherein the clip-identification information acquiring means comprises:
         family-tree-identification-information acquiring means for acquiring family-tree identification information;
      clip-information acquiring means for acquiring clip information of the ancestor clip from the conversion management information by using the clip identification information acquired by the clip-identification-information acquiring means and the family-tree identification information;
      family-tree-information acquiring means for acquiring the family-tree information by using the clip identification information and the family-tree identification information;
      conversion-parameter acquiring means for acquiring, from the conversion management information, conversion parameters that are parameters of the conversion processing; and
      conversion processing means for performing the conversion processing on the ancestor clip by using the clip information acquired by the clip-information acquiring means and the conversion parameters acquired by the conversion-parameter acquiring means, to recover a file of the intended clip.

11. The information processing device according to claim 10, wherein the conversion management information includes the clip information and family-tree information indicating a hierarchy of the conversion processing; and
    the clip-identification-information acquiring means identifies the ancestor clip on a basis of the family-tree information to acquire the clip identification information of the ancestor clip.

12. The information processing device according to claim 11, wherein the clip information includes file information of a file belonging to the clip, the conversion parameters, the clip identification information, and family-tree identification information that identifies the family-tree information.

13. The information processing device according to claim 10, further comprising conversion-management-information updating means for updating the conversion management information so as to reflect a result of the conversion processing performed by the conversion processing means.

14. The information processing device according to claim 10, wherein the conversion processing means performs all conversion processing to be used to recover the file of the intended clip from the ancestor clip.

15. The information processing device according to claim 10, further comprising omission-parameter generating means for generating, by using the conversion parameters that are obtained by the conversion-parameter acquiring means and that indicate all conversion processing to be used to recover the file of the intended clip from the ancestor clip, omission parameters that are conversion parameters with which the file of the intended clip is recovered from the ancestor clip by performing conversion processing once;
 wherein the conversion processing means recovers the file of the intended clip from the ancestor clip by performing the conversion processing once, through use of the omission parameters generated by the omission-parameter generating means.

16. The information processing device according to claim 10, further comprising mode selecting means for selecting one of a reproduction mode and an omission mode as a processing mode in which the conversion processing means recovers the file of the intended clip, wherein, in the reproduction mode, all conversion processing to be used to recover the file of the intended clip from the ancestor clip is performed, and in the omission mode, the file of the intended clip is recovered from the ancestor clip by performing conversion processing once using omission parameters that are conversion parameters generated using the conversion parameters of all conversion processing to be used to recover the file of the intended clip from the ancestor clip;
 wherein the conversion processing means performs the conversion processing in the processing mode selected by the mode selecting means to recover the file of the intended clip.

17. An information processing method comprising the steps of:
 acquiring, on a basis of conversion management information as a database that (a) indicates a history of the clip format conversion on each clip including conversion hierarchy and (b) indicates a clip identity and that indicates conversion processing for converting a clip format, clip identification information with respect to an ancestor clip of an intended clip to be generated by performing the conversion processing on the clip format of the ancestor clip, wherein presence/absence of a file can be determined from the database, and re-creation of a deleted file can be determined based upon the conversion hierarchy and clip identity, wherein acquiring the conversion management information comprises the steps of:
 generating family-tree identification information;
 acquiring clip information of the ancestor clip from the conversion management information by using the acquired clip identification information and the family-tree identification information;
 generating the family-tree information by using the clip identification information and the family-tree identification information;
 acquiring, from the conversion management information, conversion parameters that are parameters of the conversion processing; and
 performing the conversion processing on the ancestor clip by using the acquired clip information and the acquired conversion parameters, to recover a file of the intended clip.

18. An information processing device comprising:
 controller hardware includes
 a file-information acquirer configured to acquire file information that is information regarding a file to be subjected to conversion processing for converting a clip format; and
 a conversion-management-information generator configured to generate conversion management information as a database that (a) indicates a history of the clip format conversion on each clip including conversion hierarchy and (b) indicates an identity of each clip created by the conversion processing performed on the clip format of each clip to which the file corresponding to the file information belongs, by using the file information acquired by the file-information acquirer, wherein presence/absence of a file can be determined from the database, and re-creation of a deleted file can be determined based upon the conversion hierarchy and clip identity, wherein the conversion-management-information generator comprises:
 clip-identification-information generator generating clip identification information;
 family-tree-identification-information generator generating family-tree identification information;
 clip-information generator generating slip information by using the file information acquired by the file-information acquirer, the clip identification information generated by the clip-identification-information generator; and the family-tree identification information generated by the family-tree-identification-information generator; and
 family-tree-information generator generating the family-tree information by using the clip identification information generated by the clip-identification-information generator and the family-tree identification information generated by the family-tree-identification-information generator.

19. An information processing device comprising:
 controller hardware includes
 a clip-identification-information acquirer configured to acquire, on a basis of conversion management information as a database that (a) indicates a history of the clip format conversion on each clip including conversion hierarchy and (b) indicates a clip identity and that indicates conversion processing for converting a clip format, clip identification information with respect to an ancestor clip of an intended clip to be generated by performing the conversion processing on the clip format of the ancestor clip, wherein presence/absence of a file can be determined from the database, and re-creation of a deleted file can be determined based upon the conversion hierarchy and clip identity, wherein the clip-identification information acquirer comprises:
 family-tree identification information acquirer configured to acquire family-tree identification information;
 a clip-information acquirer configured to acquire clip information of the ancestor clip from the conversion management information by using the clip identification information acquired by the clip-identification-information acquirer and the family-tree identification information;

family-tree information acquirer configured to acquire the family-tree information by using the clip identification information and the family-tree identification information;

a conversion-parameter acquirer configured to acquire, from the conversion management information, conversion parameters that are parameters of the conversion processing; and a conversion processor configured to perform the conversion processing on the ancestor clip by using the clip information acquired by the clip-information acquirer and the conversion parameters acquired by the conversion-parameter acquirer, to recover a tile of the intended clip.

\* \* \* \* \*